United States Patent
Melanson

(10) Patent No.: US 7,852,017 B1
(45) Date of Patent: Dec. 14, 2010

(54) BALLAST FOR LIGHT EMITTING DIODE LIGHT SOURCES

(75) Inventor: John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 454 days.

(21) Appl. No.: 12/047,249

(22) Filed: Mar. 12, 2008

Related U.S. Application Data

(60) Provisional application No. 60/894,295, filed on Mar. 12, 2007, provisional application No. 60/909,458, filed on Apr. 1, 2007.

(51) Int. Cl.
*G05F 1/00* (2006.01)

(52) U.S. Cl. .................. 315/291; 315/247; 315/307; 315/185 S; 315/DIG. 4

(58) Field of Classification Search ............. 315/247, 315/246, 224, 225, 291, 297, 307–326, DIG. 4
See application file for complete search history.

(56) References Cited

U.S. PATENT DOCUMENTS

| | | | |
|---|---|---|---|
| 3,790,878 | A | 2/1974 | Brokaw |
| 3,881,167 | A | 4/1975 | Pelton et al. |
| 4,075,701 | A | 2/1978 | Hofmann |
| 4,334,250 | A | 6/1982 | Theus |
| 4,414,493 | A | 11/1983 | Henrich |
| 4,476,706 | A | 10/1984 | Hadden et al. |
| 4,677,366 | A | 6/1987 | Wilkinson et al. |
| 4,683,529 | A | 7/1987 | Bucher |
| 4,700,188 | A | 10/1987 | James |
| 4,737,658 | A | 4/1988 | Kronmuller et al. |
| 4,797,633 | A | 1/1989 | Humphrey |
| 4,940,929 | A | 7/1990 | Williams |

(Continued)

FOREIGN PATENT DOCUMENTS

EP        0585789 A1    3/1994

(Continued)

OTHER PUBLICATIONS

Linear Technology, "Single Switch PWM Controller with Auxiliary Boost Converter," LT1950 Datasheet, Linear Technology, Inc. Milpitas, CA, 2003.

(Continued)

*Primary Examiner*—Tuyet Thi Vo
(74) *Attorney, Agent, or Firm*—Hamilton & Terrile, LLP; Kent B. Chambers

(57) ABSTRACT

A lighting source ballast utilizes switching and control technology to convert an alternating current (AC) phase modulated dimmer input voltage into an approximately constant drive current to illuminate one or more light emitting diodes (LED(s)). In at least one embodiment, the state of the drive current conforms to a phase delay of the input voltage to facilitate, for example, dimming. The phase delay of the input voltage indicates a particular dimming level. The drive current varies for different dimming levels. However, the light source ballast controls drive current so that the drive current is approximately constant for each dimming level. In at least one embodiment, the ballast emulates a resistive load and, thus, the ballast has an approximately unity power factor. The switching frequency of one or more switches can be modified to spread the spectrum of electromagnetic radiation generated by the ballast.

22 Claims, 13 Drawing Sheets

U.S. PATENT DOCUMENTS

| | | | |
|---|---|---|---|
| 4,973,919 A | 11/1990 | Allfather |
| 4,979,087 A | 12/1990 | Sellwood et al. |
| 4,992,919 A | 2/1991 | Lee et al. |
| 4,994,952 A | 2/1991 | Silva et al. |
| 5,206,540 A | 4/1993 | da Sa e Silva et al. |
| 5,278,490 A | 1/1994 | Smedley |
| 5,323,157 A | 6/1994 | Ledzius et al. |
| 5,359,180 A | 10/1994 | Park et al. |
| 5,383,109 A | 1/1995 | Maksimovic et al. |
| 5,477,481 A | 12/1995 | Kerth |
| 5,481,178 A | 1/1996 | Wilcox et al. |
| 5,565,761 A | 10/1996 | Hwang |
| 5,638,265 A | 6/1997 | Gabor |
| 5,691,890 A | 11/1997 | Hyde |
| 5,747,977 A | 5/1998 | Hwang |
| 5,781,040 A | 7/1998 | Myers |
| 5,783,909 A | 7/1998 | Hochstein |
| 5,900,683 A | 5/1999 | Rinehart et al. |
| 5,929,400 A | 7/1999 | Colby et al. |
| 5,946,202 A | 8/1999 | Balogh |
| 5,952,849 A | 9/1999 | Haigh et al. |
| 5,963,086 A | 10/1999 | Hall |
| 5,966,297 A | 10/1999 | Minegishi |
| 5,994,885 A | 11/1999 | Wilcox et al. |
| 6,016,038 A | 1/2000 | Mueller et al. |
| 6,043,633 A | 3/2000 | Lev et al. |
| 6,072,969 A | 6/2000 | Yokomori et al. |
| 6,083,276 A | 7/2000 | Davidson et al. |
| 6,084,450 A | 7/2000 | Smith et al. |
| 6,150,774 A | 11/2000 | Mueller et al. |
| 6,211,626 B1 | 4/2001 | Lys et al. |
| 6,211,627 B1 | 4/2001 | Callahan |
| 6,229,271 B1 | 5/2001 | Liu |
| 6,246,183 B1 | 6/2001 | Buonavita |
| 6,259,614 B1 | 7/2001 | Ribarich et al. |
| 6,300,723 B1 | 10/2001 | Wang et al. |
| 6,304,066 B1 | 10/2001 | Wilcox et al. |
| 6,304,473 B1 | 10/2001 | Telefus et al. |
| 6,344,811 B1 | 2/2002 | Melanson |
| 6,385,063 B1 | 5/2002 | Sadek et al. |
| 6,407,691 B1 | 6/2002 | Yu |
| 6,441,558 B1 | 8/2002 | Muthu et al. |
| 6,445,600 B2 | 9/2002 | Ben-Yaakov |
| 6,452,521 B1 | 9/2002 | Wang |
| 6,495,964 B1 | 12/2002 | Muthu et al. |
| 6,509,913 B2 | 1/2003 | Martin, Jr. et al. |
| 6,580,258 B2 | 6/2003 | Wilcox et al. |
| 6,583,550 B2 | 6/2003 | Iwasa et al. |
| 6,636,003 B2 | 10/2003 | Rahm et al. |
| 6,713,974 B2 | 3/2004 | Patchornik et al. |
| 6,727,832 B1 | 4/2004 | Melanson |
| 6,741,123 B1 | 5/2004 | Anderson et al. |
| 6,753,661 B2 | 6/2004 | Muthu et al. |
| 6,768,655 B1 | 7/2004 | Yang et al. |
| 6,781,351 B2 | 8/2004 | Mednik et al. |
| 6,788,011 B2 | 9/2004 | Mueller et al. |
| 6,806,659 B1 | 10/2004 | Mueller et al. |
| 6,839,247 B1 | 1/2005 | Yang |
| 6,860,628 B2 | 3/2005 | Robertson et al. |
| 6,870,325 B2 | 3/2005 | Bushell et al. |
| 6,873,065 B2 | 3/2005 | Haigh et al. |
| 6,882,552 B2 | 4/2005 | Telefus et al. |
| 6,888,322 B2 | 5/2005 | Dowling et al. |
| 6,894,471 B2 | 5/2005 | Corva et al. |
| 6,933,706 B2 | 8/2005 | Shih |
| 6,940,733 B2 | 9/2005 | Schie et al. |
| 6,944,034 B1 | 9/2005 | Shytenberg et al. |
| 6,956,750 B1 | 10/2005 | Eason et al. |
| 6,958,920 B2 | 10/2005 | Mednik et al. |
| 6,967,448 B2 | 11/2005 | Morgan et al. |
| 6,970,503 B1 | 11/2005 | Kalb |
| 6,975,079 B2 | 12/2005 | Lys et al. |
| 7,003,023 B2 | 2/2006 | Krone et al. |
| 7,050,509 B2 | 5/2006 | Krone et al. |
| 7,064,498 B2 | 6/2006 | Dowling et al. |
| 7,064,531 B1 | 6/2006 | Zinn |
| 7,075,329 B2 | 7/2006 | Chen et al. |
| 7,078,963 B1 | 7/2006 | Andersen et al. |
| 7,088,059 B2 | 8/2006 | McKinney et al. |
| 7,102,902 B1 | 9/2006 | Brown et al. |
| 7,106,603 B1 | 9/2006 | Lin et al. |
| 7,109,791 B1 | 9/2006 | Epperson et al. |
| 7,135,824 B2 | 11/2006 | Lys et al. |
| 7,145,295 B1 | 12/2006 | Lee et al. |
| 7,158,633 B1 | 1/2007 | Hein |
| 7,161,816 B2 | 1/2007 | Shytenberg et al. |
| 7,183,957 B1 | 2/2007 | Melanson |
| 7,221,130 B2 | 5/2007 | Ribeiro et al. |
| 7,233,135 B2 | 6/2007 | Noma et al. |
| 7,255,457 B2 | 8/2007 | Ducharm et al. |
| 7,266,001 B1 | 9/2007 | Notohamiprodjo et al. |
| 7,288,902 B1 | 10/2007 | Melanson |
| 7,292,013 B1 | 11/2007 | Chen et al. |
| 7,310,244 B2 | 12/2007 | Yang et al. |
| 7,538,499 B2 | 5/2009 | Ashdown |
| 7,545,130 B2 | 6/2009 | Latham |
| 7,554,473 B2 | 6/2009 | Melanson |
| 7,569,996 B2 | 8/2009 | Holmes et al. |
| 7,656,103 B2 | 2/2010 | Shteynberg et al. |
| 2002/0145041 A1 | 10/2002 | Muthu et al. |
| 2002/0150151 A1 | 10/2002 | Krone et al. |
| 2002/0166073 A1 | 11/2002 | Nguyen et al. |
| 2003/0095013 A1 | 5/2003 | Melanson et al. |
| 2003/0223255 A1 | 12/2003 | Ben-Yaakov |
| 2004/0046683 A1 | 3/2004 | Mitamura et al. |
| 2004/0085030 A1 | 5/2004 | Laflamme et al. |
| 2004/0085117 A1 | 5/2004 | Melbert et al. |
| 2004/0169477 A1 | 9/2004 | Yancie et al. |
| 2004/0227571 A1 | 11/2004 | Kuribayashi |
| 2004/0228116 A1 | 11/2004 | Miller et al. |
| 2004/0232971 A1 | 11/2004 | Kawasake et al. |
| 2004/0239262 A1 | 12/2004 | Ido et al. |
| 2005/0057237 A1 | 3/2005 | Clavel |
| 2005/0156770 A1 | 7/2005 | Melanson |
| 2005/0184895 A1 | 8/2005 | Petersen et al. |
| 2005/0207190 A1 | 9/2005 | Gritter |
| 2005/0218838 A1 | 10/2005 | Lys |
| 2005/0253533 A1 | 11/2005 | Lys et al. |
| 2005/0270813 A1 | 12/2005 | Zhang et al. |
| 2005/0275354 A1 | 12/2005 | Hausman, Jr. et al. |
| 2005/0275386 A1 | 12/2005 | Jepsen et al. |
| 2006/0022916 A1 | 2/2006 | Aiello |
| 2006/0023002 A1 | 2/2006 | Hara et al. |
| 2006/0125420 A1 | 6/2006 | Boone et al. |
| 2006/0226795 A1 | 10/2006 | Walter et al. |
| 2006/0261754 A1 | 11/2006 | Lee |
| 2007/0029946 A1 | 2/2007 | Yu et al. |
| 2007/0040512 A1 | 2/2007 | Jungwirth et al. |
| 2007/0053182 A1 | 3/2007 | Robertson |
| 2007/0103949 A1 | 5/2007 | Tsuruya |
| 2007/0182699 A1 | 8/2007 | Ha et al. |
| 2008/0174372 A1 | 7/2008 | Tucker et al. |
| 2008/0192509 A1 | 8/2008 | Dhuyvetter et al. |
| 2008/0224635 A1 | 9/2008 | Hayes |
| 2008/0259655 A1 | 10/2008 | Wei et al. |
| 2008/0278132 A1 | 11/2008 | Kesterson et al. |
| 2009/0147544 A1 | 6/2009 | Melanson |
| 2009/0218960 A1 | 9/2009 | Lyons et al. |

FOREIGN PATENT DOCUMENTS

| | | |
|---|---|---|
| EP | 0910168 A1 | 4/1999 |
| EP | 1014563 | 6/2000 |
| EP | 1164819 A | 12/2001 |

| | | | |
|---|---|---|---|
| EP | 1213823 A2 | 6/2002 | |
| EP | 1528785 A | 5/2005 | |
| WO | 01/97384 A | 12/2001 | |
| WO | 0227944 | 4/2002 | |
| WO | 02/091805 A2 | 11/2002 | |
| WO | WO 2006/022107 A2 | 3/2006 | |
| WO | 2006/067521 A | 6/2006 | |
| WO | WO2006135584 | 12/2006 | |
| WO | 2007/026170 A | 3/2007 | |
| WO | 2007/079362 A | 7/2007 | |

OTHER PUBLICATIONS

Yu, Zhenyu, 3.3V DSP for Digital Motor Control, Texas Instruments, Application Report SPRA550 dated Jun. 1999.

International Rectifier, Data Sheet No. PD60143-O, Current Sensing Single Channel Driver, El Segundo, CA, dated Sep. 8, 2004.

Balogh, Laszlo, "Design and Application Guide for High Speed MOSFET Gate Drive Circuits" [Online] 2001, Texas Instruments, Inc., SEM-1400, Unitrode Power Supply Design Seminar, Topic II, TI literature No. SLUP133, XP002552367, Retrieved from the Internet: URL:htt[://focus.ti.com/lit/ml/slup169/slup169.pdf the whole document.

ST Datasheet L6562, Transition-Mode PFC Controller, 2005, STMicroelectronics, Geneva, Switzerland.

Maksimovic, Regan Zane and Robert Erickson, Impact of Digital Control in Power Electronics, Proceedings of 2004 International Symposium on Power Semiconductor Devices & Ics, Kitakyushu, , Apr. 5, 2010, Colorado Power Electronics Center, ECE Department, University of Colorado, Boulder, CO.

Freescale Semiconductor, Inc., Dimmable Light Ballast with Power Factor Correction, Design Reference Manual, DRM067, Rev. 1, Dec. 2005.

J. Zhou et al., Novel Sampling Algorithm for DSP Controlled 2 kW PFC Converter, IEEE Transactions on Power Electronics, vol. 16, No. 2, Mar. 2001.

A. Prodic, Compensator Design and Stability Assessment for Fast Voltage Loops of Power Factor Correction Rectifiers, IEEE Transactions on Power Electronics, vol. 22, No. 5, Sep. 2007.

M. Brkovic et al., "Automatic Current Shaper with Fast Output Regulation and Soft-Switching," S.15.C Power Converters, Telecommunications Energy Conference, 1993.

Dallas Semiconductor, Maxim, "Charge-Pump and Step-Up DC-DC Converter Solutions for Powering White LEDs in Series or Parallel Connections," Apr. 23, 2002.

Freescale Semiconductor, AN3052, Implementing PFC Average Current Mode Control Using the MC9S12E128, Nov. 2005.

D. Maksimovic et al., "Switching Converters with Wide DC Conversion Range," Institute of Electrical and Electronic Engineer's (IEEE) Transactions on Power Electronics, Jan. 1991.

V. Nguyen et al., "Tracking Control of Buck Converter Using Sliding-Mode with Adaptive Hysteresis," Power Electronics Specialists Conference, 1995. PESC apos; 95 Record., 26th Annual IEEE vol. 2, Issue , Jun. 18-22, 1995 pp. 1086-1093.

S. Zhou et al., "A High Efficiency, Soft Switching DC-DC Converter with Adaptive Current-Ripple Control for Portable Applications," IEEE Transactions on Circuits and Systems—II: Express Briefs, vol. 53, No. 4, Apr. 2006.

K. Leung et al., "Use of State Trajectory Prediction in Hysteresis Control for Achieving Fast Transient Response of the Buck Converter," Circuits and Systems, 2003. ISCAS apos;03. Proceedings of the 2003 International Symposium, vol. 3, Issue , May 25-28, 2003 pp. III-439-III-442 vol. 3.

K. Leung et al., "Dynamic Hysteresis Band Control of the Buck Converter with Fast Transient Response," IEEE Transactions on Circuits and Systems—II: Express Briefs, vol. 52, No. 7, Jul. 2005.

Y. Ohno, Spectral Design Considerations for White LED Color Rendering, Final Manuscript, Optical Engineering, vol. 44, 111302 (2005).

S. Skogstad et al., A Proposed Stability Characterization and Verification Method for High-Order Single-Bit Delta-Sigma Modulators, Norchip Conference, Nov. 2006 http://folk.uio.no/savskogs/pub/A_Proposed_Stability_Characterization.pdf.

J. Turchi, Four Key Steps to Design a Continuous Conduction Mode PFC Stage Using the NCP1653, ON Semiconductor, Publication Order No. AND184/D, Nov. 2004.

Megaman, D or S Dimming ESL, Product News, Mar. 15, 2007.

J. Qian et al., New Charge Pump Power-Factor-Correction Electronic Ballast with a Wide Range of Line Input Voltage, IEEE Transactions on Power Electronics, vol. 14, No. 1, Jan. 1999.

P. Green, A Ballast that can be Dimmed from a Domestic (Phase-Cut) Dimmer, IRPLCFL3 rev. b, International Rectifier, http://www.irf.com/technical-info/refdesigns/cfl-3.pdf, printed Mar. 24, 2007.

J. Qian et al., Charge Pump Power-Factor-Correction Technologies Part II: Ballast Applications, IEEE Transactions on Power Electronics, vol. 15, No. 1, Jan. 2000.

Chromacity Shifts in High-Power White LED Systems due to Different Dimming Methods, Solid-State Lighting, http://www.lrc.rpi.edu/programs/solidstate/completedProjects.asp?ID=76, printed May 3, 2007.

S. Chan et al., Design and Implementation of Dimmable Electronic Ballast Based on Integrated Inductor, IEEE Transactions on Power Electronics, vol. 22, No. 1, Jan. 2007.

M. Madigan et al., Integrated High-Quality Rectifier-Regulators, IEEE Transactions on Industrial Electronics, vol. 46, No. 4, Aug. 1999.

T. Wu et al., Single-Stage Electronic Ballast with Dimming Feature and Unity Power Factor, IEEE Transactions on Power Electronics, vol. 13, No. 3, May 1998.

F. Tao et al., "Single-Stage Power-Factor-Correction Electronic Ballast with a Wide Continuous Dimming Control for Fluorescent Lamps," IEEE Power Electronics Specialists Conference, vol. 2, 2001.

Azoteq, IQS17 Family, IQ Switch®—ProxSense™ Series, Touch Sensor, Load Control and User Interface, IQS17 Datasheet V2.00. doc, Jan. 2007.

C. Dilouie, Introducing the LED Driver, EC&M, Sep. 2004.

S. Lee et al., TRIAC Dimmable Ballast with Power Equalization, IEEE Transactions on Power Electronics, vol. 20, No. 6, Nov. 2005.

L. Gonthier et al., EN55015 Compliant 500W Dimmer with Low-Losses Symmetrical Switches, 2005 European Conference on Power Electronics and Applications, Sep. 2005.

Why Different Dimming Ranges? The Difference Between Measured and Perceived Light, http://www.lutron.com/ballast/pdf/LutronBallastpg3.pdf.

D. Hausman, Real-Time Illumination Stability Systems for Trailing-Edge (Reverse Phase Control) Dimmers, Technical White Paper, Lutron, version 1.0, Dec. 2004, http://www.lutron.com/technical_info/pdf/RTISS-TE.pdf.

Light Dimmer Circuits, www.epanorama.net/documents/lights/lightdimmer.html, printed Mar. 26, 2007.

Light Emitting Diode, http://en.wikipedia.org/wiki/Light-emitting_diode, printed Mar. 27, 2007.

Color Temperature, www.sizes.com/units/color_temperature.htm, printed Mar. 27, 2007.

S. Lee et al., A Novel Electrode Power Profiler for Dimmable Ballasts Using DC Link Voltage and Switching Frequency Controls, IEEE Transactions on Power Electronics, vol. 19, No. 3, May 2004.

Y. Ji et al., Compatibility Testing of Fluorescent Lamp and Ballast Systems, IEEE Transactions on Industry Applications, vol. 35, No. 6, Nov./Dec. 1999.

National Lighting Product Information Program, Specifier Reports, "Dimming Electronic Ballasts," vol. 7, No. 3, Oct. 1999.

Supertex Inc., Buck-based LED Drivers Using the HV9910B, Application Note AN-H48, Dec. 28, 2007.

D. Rand et al., Issues, Models and Solutions for Triac Modulated Phase Dimming of LED Lamps, Power Electronics Specialists Conference, 2007.

Supertex Inc., HV9931 Unity Power Factor LED Lamp Driver, Application Note AN-H52, Mar. 7, 2007.

Supertex Inc., 56W Off-line LED Driver, 120VAC with PFC, 160V, 350mA Load, Dimmer Switch Compatible, DN-H05, Feb. 2007.

ST Microelectronics, Power Factor Corrector L6561, Jun. 2004.

Fairchild Semiconductor, Application Note 42047 Power Factor Correction (PFC) Basics, Rev. 0.9.0 Aug. 19, 2004.

M. Radecker et al., Application of Single-Transistor Smart-Power IC for Fluorescent Lamp Ballast, Thirty-Fourth Annual Industry Applications Conference IEEE, vol. 1, Oct. 3, 1999-Oct. 7, 1999.

M. Rico-Secades et al., Low Cost Electronic Ballast for a 36-W Fluorescent Lamp Based on a Current-Mode-Controlled Boost Inverter for a 120-V DC Bus Power Distribution, IEEE Transactions on Power Electronics, vol. 21, No. 4, Jul. 2006.

Fairchild Semiconductor, FAN4800, Low Start-up Current PFC/PWM Controller Combos, Nov. 2006.

Fairchild Semiconductor, FAN4810, Power Factor Correction Controller, Sep. 24, 2003.

Fairchild Semiconductor, FAN4822, ZVS Average Current PFC Controller, Aug. 10, 2001.

Fairchild Semiconductor, FAN7527B, Power Factor Correction Controller, 2003.

Fairchild Semiconductor, ML4821, Power Factor Controller, Jun. 19, 2001.

Freescale Semiconductor, AN1965, Design of Indirect Power Factor Correction Using 56F800/E, Jul. 2005.

International Search Report for PCT/US2008/051072, mailed Jun. 4, 2008.

Infineon, CCM-PFC Standalone Power Factor Correction (PFC) Controller in Continuous Conduction Mode (CCM), Version 2.1, Feb. 6, 2007.

International Rectifier, IRAC1150-300W Demo Board, User's Guide, Rev 3.0, Aug. 2, 2005.

International Rectifier, Application Note AN-1077,PFC Converter Design with IR1150 One Cycle Control IC, rev. 2.3, Jun. 2005.

International Rectifier, Data Sheet PD60230 revC, Feb. 5, 2007.

Lu et al., International Rectifier, Bridgeless PFC Implementation Using One Cycle Control Technique, 2005.

Linear Technology, LT1248, Power Factor Controller, Apr. 20, 2007.

ON Semiconductor, AND8123/D, Power Factor Correction Stages Operating in Critical Conduction Mode, Sep. 2003.

ON Semiconductor, MC33260, GreenLine Compact Power Factor Controller: Innovative Circuit for Cost Effective Solutions, Sep. 2005.

ON Semiconductor, NCP1605, Enhanced, High Voltage and Efficient Standby Mode, Power Factor Controller, Feb. 2007.

ON Semconductor, NCP1606, Cost Effective Power Factor Controller, Mar. 2007.

ON Semiconductor, NCP1654, Product Review, Power Factor Controller for Compact and Robust, Continuous Conduction Mode Pre-Converters, Mar. 2007.

Philips, Application Note, 90W Resonant SMPS with TEA1610 SwingChip, AN99011, 1999.

NXP, TEA1750, GreenChip III SMPS control IC Product Data Sheet, Apr. 6, 2007.

Renesas, HA16174P/FP, Power Factor Correction Controller IC, Jan. 6, 2006.

Renesas Technology Releases Industry's First Critical-Conduction-Mode Power Factor Correction Control IC Implementing Interleaved Operation, Dec. 18, 2006.

Renesas, Application Note R2A20111 EVB, PFC Control IC R2A20111 Evaluation Board, Feb. 2007.

STMicroelectronics, L6563, Advanced Transition-Mode PFC Controller, Mar. 2007.

Texas Instruments, Application Note SLUA321, Startup Current Transient of the Leading Edge Triggered PFC Controllers, Jul. 2004.

Texas Instruments, Application Report, SLUA309A, Avoiding Audible Noise at Light Loads when using Leading Edge Triggered PFC Converters, Sep. 2004.

Texas Instruments, Application Report SLUA369B, 350-W, Two-Phase Interleaved PFC Pre-Regulator Design Review, Mar. 2007.

Unitrode, High Power-Factor Preregulator, Oct. 1994.

Texas Instruments, Transition Mode PFC Controller, SLUS515D, Jul. 2005.

Unitrode Products From Texas Instruments, Programmable Output Power Factor Preregulator, Dec. 2004.

Unitrode Products From Texas Instruments, High Performance Power Factor Preregulator, Oct. 2005.

Texas Instruments, UCC3817 BiCMOS Power Factor Preregulator Evaluation Board User's Guide, Nov. 2002.

Unitrode, L. Balogh, Design Note UC3854A/B and UC3855A/B Provide Power Limiting with Sinusoidal Input Current for PFC Front Ends, SLUA196A, Nov. 2001.

A. Silva De Morais et al., A High Power Factor Ballast Using a Single Switch with Both Power Stages Integrated, IEEE Transactions on Power Electronics, vol. 21, No. 2, Mar. 2006.

M. Ponce et al., High-Efficient Integrated Electronic Ballast for Compact Fluorescent Lamps, IEEE Transactions on Power Electronics, vol. 21, No. 2, Mar. 2006.

A. R. Seidel et al., A Practical Comparison Among High-Power-Factor Electronic Ballasts with Similar Ideas, IEEE Transactions on Industry Applications, vol. 41, No. 6, Nov.-Dec. 2005.

F. T. Wakabayashi et al., An Improved Design Procedure for LCC Resonant Filter of Dimmable Electronic Ballasts for Fluorescent Lamps, Based on Lamp Model, IEEE Transactions on Power Electronics, vol. 20, No. 2, Sep. 2005.

J. A. Vilela Jr. et al., An Electronic Ballast with High Power Factor and Low Voltage Stress, IEEE Transactions on Industry Applications, vol. 41, No. 4, Jul./Aug. 2005.

S. T.S. Lee et al., Use of Saturable Inductor to Improve the Dimming Characteristics of Frequency-Controlled Dimmable Electronic Ballasts, IEEE Transactions on Power Electronics, vol. 19, No. 6, Nov. 2004.

M. K. Kazimierczuk et al., Electronic Ballast for Fluorescent Lamps, IEEETransactions on Power Electronics, vol. 8, No. 4, Oct. 1993.

S. Ben-Yaakov et al., Statics and Dynamics of Fluorescent Lamps Operating at High Frequency: Modeling and Simulation, IEEE Transactions on Industry Applications, vol. 38, No. 6, Nov.-Dec. 2002.

H. L. Cheng et al., A Novel Single-Stage High-Power-Factor Electronic Ballast with Symmetrical Topology, IEEE Transactions on Power Electronics, vol. 50, No. 4, Aug. 2003.

J.W.F. Dorleijn et al., Standardisation of the Static Resistances of Fluorescent Lamp Cathodes and New Data for Preheating, Industry Applications Conference, vol. 1, Oct. 13, 2002-Oct. 18, 2002.

Q. Li et al., An Analysis of the ZVS Two-Inductor Boost Converter under Variable Frequency Operation, IEEE Transactions on Power Electronics, vol. 22, No. 1, Jan. 2007.

H. Peng et al., Modeling of Quantization Effects in Digitally Controlled DC-DC Converters, IEEE Transactions on Power Electronics, vol. 22, No. 1, Jan. 2007.

G.Yao et al., Soft Switching Circuit for Interleaved Boost Converters, IEEE Transactions on Power Electronics, vol. 22, No. 1, Jan. 2007.

C. M. De Oliviera Stein et al., A ZCT Auxiliary Communication Circuit for Interleaved Boost Converters Operating in Critical Conduction Mode, IEEE Transactions on Power Electronics, vol. 17, No. 6, Nov. 2002.

W. Zhang et al., A New Duty Cycle Control Strategy for Power Factor Correction and FPGA Implementation, IEEE Transactions on Power Electronics, vol. 21, No. 6, Nov. 2006.

H. Wu et al., Single Phase Three-Level Power Factor Correction Circuit with Passive Lossless Snubber, IEEE Transactions on Power Electronics, vol. 17, No. 2, Mar. 2006.

O. Garcia et al., High Efficiency PFC Converter to Meet EN61000-3-2 and A14, Proceedings of the 2002 IEEE International Symposium on Industrial Electronics, vol. 3, 2002.

P. Lee et al., Steady-State Analysis of an Interleaved Boost Converter with Coupled Inductors, IEEE Transactions on Industrial Electronics, vol. 47, No. 4, Aug. 2000.

D.K.W. Cheng et al., A New Improved Boost Converter with Ripple Free Input Current Using Coupled Inductors, Power Electronics and Variable Speed Drives, Sep. 21-23, 1998.

B.A. Miwa et al., High Efficiency Power Factor Correction Using Interleaved Techniques, Applied Power Electronics Conference and Exposition, Seventh Annual Conference Proceedings, Feb. 23-27, 1992.

Z. Lai et al., A Family of Power-Factor-Correction Controllers, Twelfth Annual Applied Power Electronics Conference and Exposition, vol. 1, Feb. 23, 1997-Feb. 27, 1997.

L. Balogh et al., Power-Factor Correction with Interleaved Boost Converters in Continuous-Inductor-Current Mode, Eighth Annual Applied Power Electronics Conference and Exposition, 1993. APEC '93. Conference Proceedings, Mar. 7, 1993-Mar. 11, 1993.

Fairchild Semiconductor, Application Note 42030, Theory and Application of the ML4821 Average Current Mode PFC Controller, Oct. 25, 2000.
Unitrode Products From Texas Instruments, BiCMOS Power Factor Preregulator, Feb. 2006.
D. Hausman, Lutron, RTISS-TE Operation, Real-Time Illumination Stability Systems for Trailing-Edge (Reverse Phase Control) Dimmers, v. 1.0 Dec. 2004.
International Rectifier, Data Sheet No. PD60230 revC, IR1150(S)(PbF), uPFC One Cycle Control PFC IC Feb. 5, 2007.
Texas Instruments, Application Report SLUA308, UCC3817 Current Sense Transformer Evaluation, Feb. 2004.
Texas Instruments, Application Report SPRA902A, Average Current Mode Controlled Power Factor Correctiom Converter using TMS320LF2407A, Jul. 2005.
Unitrode, Design Note DN-39E, Optimizing Performance in UC3854 Power Factor Correction Applications, Nov. 1994.
Fairchild Semiconductor, Application Note 42030, Theory and Application of the ML4821 Average Currrent Mode PFC Controller, Aug. 1997.
Fairchild Semiconductor, Application Note AN4121, Design of Power Factor Correction Circuit Using FAN7527B, Rev.1.0.1, May 30, 2002.
Fairchild Semiconductor, Application Note 6004, 500W Power-Factor-Corrected (PFC) Converter Design with FAN4810, Rev. 1.0.1, Oct. 31, 2003.
Fairchild Semiconductor, FAN4822, ZVA Average Current PFC Controller, Rev. 1.0.1 Aug. 10, 2001.
Fairchild Semiconductor, ML4821, Power Factor Controller, Rev. 1.0.2, Jun. 19, 2001.
Fairchild Semiconductor, ML4812, Power Factor Controller, Rev. 1.0.4, May 31, 2001.
Linear Technology, 100 Watt LED Driver, undated.
Fairchild Semiconductor, FAN7544, Simple Ballast Controller, Rev. 1.0.0.
Fairchild Semiconductor, FAN7532, Ballast Controller, Rev. 1.0.2.
Fairchild Semiconductor, FAN7711, Ballast Control IC, Rev. 1.0.2.
Fairchild Semiconductor, KA7541, Simple Ballast Controller, Rev. 1.0.3.
ST Microelectronics, L6574, CFL/TL Ballast Driver Preheat and Dimming, Sep. 2003.
ST Microelectronics, AN993, Application Note, Electronic Ballast with PFC Using L6574 and L6561, May 2004.
International Search Report and Written Opinion for PCT/US2008/062384 dated Jan. 14, 2008.
S. Dunlap et al., Design of Delta-Sigma Modulated Switching Power Supply, Circuits & Systems, Proceedings of the 1998 IEEE International Symposium, 1998.
Power Integrations, Inc., "TOP200-4/14 TOPSwitch Family Three-terminal Off-line PWM Switch", XP-002524650, Jul. 1996, Sunnyvale, California.
Texas Instruments, SLOS318F, "High-Speed, Low Noise, Fully-Differential I/O Amplifiers," THS4130 and THS4131, US, Jan. 2006.
International Search Report and Written Opinion, PCT US20080062387, dated Feb. 5, 2008.
International Search Report and Written Opinion, PCT US200900032358, dated Jan. 29, 2009.
Hirota, Atsushi et al, "Analysis of Single Switch Delta-Sigma Modulated Pulse Space Modulation PFC Converter Effectively Using Switching Power Device," IEEE, US, 2002.
Prodic, Aleksandar, "Digital Controller for High-Frequency Rectifiers with Power Factor Correction Suitable for On-Chip Implementation," IEEE, US, 2007.
International Search Report and Written Opinion, PCT US20080062378, dated Feb. 5, 2008.
International Search Report and Written Opinion, PCT US20090032351, dated Jan. 29, 2009.
Erickson, Robert W. et al, "Fundamentals of Power Electronics," Second Edition, Chapter 6, Boulder, CO, 2001.

Allegro Microsystems, A1442, "Low Voltage Full Bridge Brushless DC Motor Driver with Hall Commutation and Soft-Switching, and Reverse Battery, Short Circuit, and Thermal Shutdown Protection," Worcester MA, 2009.
Texas Instruments, SLUS828B, "8-Pin Continuous Conduction Mode (CCM) PFC Controller", UCC28019A, US, revised Apr. 2009.
Analog Devices, "120 kHz Bandwidth, Low Distortion, Isolation Amplifier", AD215, Norwood, MA, 1996.
Burr-Brown, ISO120 and ISO121, "Precision Los Cost Isolation Amplifier," Tucson AZ, Mar. 1992.
Burr-Brown, ISO130, "High IMR, Low Cost Isolation Amplifier," SBOS220, US, Oct. 2001.
International Search Report and Written Report PCT US20080062428 dated Feb. 5, 2008.
Prodic, A. et al, "Dead Zone Digital Controller for Improved Dynamic Response of Power Factor Preregulators," IEEE, 2003.
PCT US2009/051746, International Search Report and Written Opinion dated Sep. 1, 2009.
PCT US09/51757, International Search Report and Written Opinion dated Aug. 28, 2009.
"HV9931 Unity Power Factor LED Lamp Driver, Initial Release" 2005, Supertex Inc., Sunnyvale, CA USA.
AN-H52 Application Note: "HV9931 Unity Power Factor LED Lamp Driver" Mar. 7, 2007, Supertex Inc., Sunnyvale, CA, USA.
Dustin Rand et al: "Issues, Models and Solutions for Triac Modulated Phase Dimming of LED Lamps" Power Electronics Specialists Conference, 2007. PESC 2007, IEEE, IEEE, P1, Jun. 1, 2007, pp. 1398-1404.
Spiazzi G et al: "Analysis of a High-Power-Factor Electronic Ballast for High Brightness Light Emitting Diodes" Power Electronics Specialists, 2005 IEEE 36th Conference on Jun. 12, 2005, Piscatawa, NJ USA, IEEE, Jun. 12, 2005, pp. 1494-1499.
International Search Report PCT/US2008/062381 dated Feb. 5, 2008.
International Search Report PCT/US2008/056739 dated Dec. 3, 2008.
Written Opinion of the International Searching Authority PCT/US2008/062381 dated Feb. 5, 2008.
Ben-Yaakov et al, "The Dynamics of a PWM Boost Converter with Resistive Input" IEEE Transactions on Industrial Electronics, IEEE Service Center, Piscataway, NJ, USA, vol. 46, No. 3, Jun. 1, 1999.
International Search Report PCT/US2008/062398 dated Feb. 5, 2008.
Partial International Search PCT/US2008/062387 dated Feb. 5, 2008.
Noon, Jim "UC3855A/B High Performance Power Factor Preregulator", Texas Instruments, SLUA146A, May 1996, Revised Apr. 2004.
"High Performance Power Factor Preregulator", Unitrode Products from Texas Instruments, SLUS382B, Jun. 1998, Revised Oct. 2005.
International Search Report PCT/GB2006/003259 dated Jan. 12, 2007.
Written Opinion of the International Searching Authority PCT/US2008/056739.
International Search Report PCT/US2008/056606 dated Dec. 3, 2008.
Written Opinion of the International Searching Authority PCT/US2008/056606 dated Dec. 3, 2008.
International Search Report PCT/US2008/056608 dated Dec. 3, 2008.
Written Opinion of the International Searching Authority PCT/US2008/056608 dated Dec. 3, 2008.
International Search Report PCT/GB2005/050228 dated Mar. 14, 2006.
International Search PCT/US2008/062387 dated Jan. 10, 2008.
Data Sheet LT3496 Triple Output LED Driver, 2007, Linear Technology Corporation, Milpitas, CA.
News Release, Triple Output LED, LT3496.

BALLAST FOR LIGHT EMITTING DIODE LIGHT SOURCES

CROSS REFERENCE TO RELATED APPLICATIONS

This application claims the benefit under 35 U.S.C. §119 (e) and 37 C.F.R. §1.78 of U.S. Provisional Application No. 60/894,295, filed Mar. 12, 2007 and entitled "Lighting Fixture." U.S. Provisional Application No. 60/894,295 includes exemplary systems and methods and is incorporated by reference in its entirety.

This application claims the benefit under 35 U.S.C. §119 (e) and 37 C.F.R. §1.78 of U.S. Provisional Application No. 60/909,458, entitled "Ballast for Light Emitting Diode Light Sources," inventor John L. Melanson, and filed on Apr. 1, 2007 describes exemplary methods and systems and is incorporated by reference in its entirety.

U.S. patent application Ser. No. 11/926,864, entitled "Color Variations in a Dimmable Lighting Device with Stable Color Temperature Light Sources," inventor John L. Melanson, and filed on Mar. 31, 2007 describes exemplary methods and systems and is incorporated by reference in its entirety.

U.S. Provisional Application No. 60/909,457, entitled "Multi-Function Duty Cycle Modifier," inventors John L. Melanson and John Paulos, and filed on Mar. 31, 2007 describes exemplary methods and systems and is incorporated by reference in its entirety. Referred to herein as Melanson I.

U.S. patent application Ser. No. 12/047,258, entitled "Multi-Function Duty Cycle Modifier," inventors John L. Melanson and John Paulos, and filed on Mar. 12, 2008 describes exemplary methods and systems and is incorporated by reference in its entirety. Referred to herein as Melanson II.

U.S. patent application Ser. No. 11/695,024, entitled "Lighting System with Lighting Dimmer Output Mapping," inventors John L. Melanson and John Paulos, and filed on Mar. 31, 2007 describes exemplary methods and systems and is incorporated by reference in its entirety. Referred to herein as Melanson III.

U.S. patent application Ser. No. 11/864,366, entitled "Time-Based Control of a System having Integration Response," inventor John L. Melanson, and filed on Sep. 28, 2007 describes exemplary methods and systems and is incorporated by reference in its entirety. Referred to herein as Melanson IV.

U.S. patent application Ser. No. 11/967,269, entitled "Power Control System Using a Nonlinear Delta-Sigma Modulator with Nonlinear Power Conversion Process Modeling," inventor John L. Melanson, and filed on Dec. 31, 2007 describes exemplary methods and systems and is incorporated by reference in its entirety. Referred to herein as Melanson V.

U.S. patent application Ser. No. 11/967,275, entitled "Programmable Power Control System," inventor John L. Melanson, and filed on Dec. 31, 2007 describes exemplary methods and systems and is incorporated by reference in its entirety. Referred to herein as Melanson VI.

U.S. patent application Ser. No. 12/047,262, entitled "Power Control System for Voltage Regulated Light Sources," inventor John L. Melanson, and filed on Mar. 12, 2007 describes exemplary methods and systems and is incorporated by reference in its entirety.

BACKGROUND OF THE INVENTION

1. Field of the Invention

The present invention relates in general to the field of electronics and lighting, and more specifically to a system and method for providing ballast for light sources, such as light emitting diode light sources.

2. Description of the Related Art

Commercially practical incandescent light bulbs have been available for over 100 years. However, other light sources show promise as commercially viable alternatives to the incandescent light bulb. Light Emitting Diodes ("LEDs") are becoming particularly attractive as main stream light sources in part because of energy savings through high efficiency light output, long life, and environmental incentives such as the reduction of mercury.

LEDs are semiconductor devices and are best driven by direct current. The brightness of the LED varies in direct proportion to the current flowing through the LED. Thus, increasing current supplied to an LED increases the brightness of the LED and decreasing current supplied to the LED dims the LED.

Dimming a light source saves energy when operating a light source and also allows a user to adjust the brightness of the light source to a desired level. Many facilities, such as homes and buildings, include light source dimming circuits (referred to herein as "dimmers").

FIG. 1 depicts a lighting circuit 100 with a conventional dimmer 102 for dimming incandescent light source 104 in response to inputs to variable resistor 106. The dimmer 102, light source 104, and voltage source 108 are connected in series. Voltage source 108 supplies alternating current at line voltage $V_{line}$. The line voltage $V_{line}$ can vary depending upon geographic location. The line voltage $V_{line}$ is typically 120 Vac with a typical frequency of 60 Hz or 230 Vac with a typical frequency of 50 Hz. Instead of diverting energy from the light source 104 into a resistor, dimmer 102 switches the light source 104 off and on many times every second to reduce the total amount of energy provided to light source 104. A user can select the resistance of variable resistor 106 and, thus, adjust the charge time of capacitor 110. A second, fixed resistor 112 provides a minimum resistance when the variable resistor 106 is set to 0 ohms. When capacitor 110 charges to a voltage greater than a trigger voltage of diac 114, the diac 114 conducts and the gate of triac 116 charges. The resulting voltage at the gate of triac 116 and across bias resistor 118 causes the triac 116 to conduct. When the current I passes through zero, the triac 116 becomes nonconductive, i.e. turns 'off'. When the triac 116 is nonconductive, the dimmer output voltage $V_{DIM}$ is 0 V. When triac 116 conducts, the dimmer output voltage $V_{DIM}$ equals the line voltage $V_{line}$. The charge time of capacitor 110 required to charge capacitor 110 to a voltage sufficient to trigger diac 114 depends upon the value of current I. The value of current I depends upon the resistance of variable resistor 106 and resistor 112. Thus, adjusting the resistance of variable resistor 106 adjusts the phase angle of dimmer output voltage $V_{DIM}$. Adjusting the phase angle of dimmer output voltage $V_{DIM}$ is equivalent to adjusting the phase angle of dimmer output voltage $V_{DIM}$. Adjusting the phase angle of dimmer output voltage $V_{DIM}$ adjusts the average power to light source 104, which adjusts the intensity of light source 104. The term "phase angle" is also commonly referred to as a "phase delay". Thus, adjusting the phase angle of dimmer output voltage $V_{DIM}$ can also be referred to as adjusting the phase delay of dimmer output signal $V_{DIM}$. Dimmer 102 only modifies the leading edge of each half cycle of voltage $V_{line}$.

FIG. 2 depicts the dimmer output voltage $V_{DIM}$ waveform of dimmer 102. The dimmer output voltage $V_{DIM}$ fluctuates during each period from a positive voltage to a negative voltage. (The positive and negative voltages are characterized with respect to a reference to a direct current (DC) voltage level, such as a neutral or common voltage reference.) The period of each voltage sine wave 202.0 through 202.N is the same as 1/frequency of $V_{line}$ (FIG. 1), where N is an integer. The dimmer output voltage $V_{DIM}$ is a phase modulated dimmer signal. The dimmer 102 chops the voltage sine waves 202.0 through 202.N to alter the duty cycle of each sine wave 202.0 through 202.N. The dimmer 102 chops the positive half of sine wave 202.0 at time $t_1$ so that the positive portion of sine wave 202.0 is 0 V from time $t_0$ through time $t_1$ and has a positive voltage from time $t_1$ to time $t_2$. The difference in time between time $t_0$ at which a full cycle of sine wave 202 would have started but for the chopping and the time $t_1$ at which dimmer output voltage $V_{DIM}$ is chopped introduces a phase delay α into sine wave 202. For example, for sine wave 202.0, $α_{202.0}$=sine wave chop time $t_1$-full cycle start time $t_0$ and $α_{202.N}$=$t_4$-$t_3$. The phase delay α is the same for the negative half of sine wave 202. Additionally, since the dimmer output voltage $V_{DIM}$ is periodic, the phase delay can also be referred to as a phase angle. Each half cycle of sine wave 202 is 180 degrees, and the phase angle is 180 degrees minus the (phase delay/the half period) times 180 degrees. For example, the phase angle $□_{202.0}$ equals 180·[1-($t_1$-$t_0$)/($t_2$-$t_0$)] for sine wave 202.0 The "Sine wave 202" represents all sine waves 202.0 through 202.N. The light source 104 is, thus, turned 'off' from times $t_0$ through $t_1$ and turned 'on' from times $t_1$ through $t_2$. Dimmer 102 chops the negative half of sine wave 202.0 with the same timing as the positive half Equation [1] represents the duty cycle of dimmer 102:

$$\text{Duty Cycle} = \frac{(t_2 - t_1)}{(t_2 - t_0)}. \quad [1]$$

When the resistance of variable resistance 106 is increased, the duty cycle of dimmer 102 decreases. Between time $t_2$ and time $t_3$, the resistance of variable resistance 106 is increased, and, thus, dimmer 102 chops the full cycle 202.N at later times in the first half cycle 204.N and the second half cycle 206.N of the full cycle of voltage sine wave 202.N with respect to voltage sine wave 202.0. Dimmer 102 chops the first half cycle 204.N with the same timing as the second half cycle 206.N. So, the duty cycles of each half cycle of voltage sine wave 202.N are the same. Thus, the full duty cycle of dimmer 102 for voltage sine wave 202.N is:

$$\text{Duty Cycle} = \frac{(t_5 - t_4)}{(t_5 - t_3)}. \quad [2]$$

Since times ($t_5$-$t_4$)<($t_2$-$t_1$), less average power is delivered to light source 104 by the sine wave 202.N than sine wave 202.0 of dimmer voltage $V_{DIM}$, and the intensity of light source 104 decreases at time $t_3$ relative to the intensity at time $t_2$.

The voltage and current fluctuations of conventional dimmer circuits, such as dimmer 102, can destroy LEDs. U.S. Pat. No. 7,102,902, filed Feb. 17, 2005, inventors Emery Brown and Lodhie Pervaiz, and entitled "Dimmer Circuit for LED" (referred to here as the "Brown Patent") describes a circuit that supplies a specialized load to a conventional AC dimmer which, in turn, controls an LED device. The Brown Patent describes dimming the LED by adjusting the duty cycle of the voltage and current provided to the load and providing a minimum load to the dimmer to allow dimmer current to go to zero.

Exemplary modification of leading edges and trailing edges of dimmer signals is discussed in "Real-Time Illumination Stability Systems for Trailing-Edge (Reverse Phase Control) Dimmers" by Don Hausman, Lutron Electronics Co., Inc. of Coopersburg, Pa., U.S.A., Technical White Paper, December 2004, which is incorporated herein by reference.

Line voltage fluctuations adversely affect LEDs. Line voltage fluctuations can produce a disproportional change in drive current to the LED. Increases in drive current increase heat and, thus, reduce the useful life of the LED. Useful life can be defined, for example, when the light output of the LED declines by thirty percent or more.

SUMMARY OF THE INVENTION

In one embodiment of the present invention, a lighting system ballast includes a light source driver stage configured to deliver power to one or more light emitting diodes with an adjustable drive current. The lighting system also includes a sensor having one or more input terminals to receive a phase modulated dimmer signal, wherein a phase delay of the phase modulated dimmer signal indicates a dimming level and the sensor is configured to detect the dimming level and to generate a dimmer output signal representing a dimming level indicated by the dimmer signal. The lighting system also includes a controller coupled to the light source driver stage and the sensor. The controller includes at least one input terminal to receive the dimmer output signal from the sensor and to generate a drive control signal to cause a drive current supplied to each light emitting diode to dim each light emitting diode in response to the dimmer signal. The drive current is approximately constant for each dimming level throughout a cycle of the phase modulated dimmer signal.

In another embodiment of the present invention, a method of supplying a drive current to one or more light emitting diodes includes receiving a phase modulated dimmer signal wherein a phase delay of the phase modulated dimmer signal indicates a dimming level. The method further includes generating a dimmer output signal representing a dimming level indicated by the dimmer signal and generating a drive control signal to cause the drive current to respond to the dimmer output signal. The method also includes providing the drive control signal to a switch to vary conductivity of the switch and cause the drive current supplied by the light source driver stage to each of the light emitting diodes to be approximately constant through a cycle of the phase modulated dimming signal.

In a further embodiment of the present invention, a lighting system includes a light source ballast system. The light source ballast system includes a power factor converter and drive system to receive an alternating current, phase modulated dimmer input voltage, to convert the input voltage into a power factor corrected direct current (DC) output voltage, and to generate a light emitting diode drive current. A phase delay of the dimmer input voltage indicates a dimming level. The system also includes a ballast controller, coupled to the power factor converter and drive system, to generate one or more control signals for the power factor converter and drive system to control power factor correction and to adjust the drive current in conformance with the dimming level represented by the dimmer signal. The drive current is approximately constant throughout a cycle of the phase modulated input voltage for each dimming level and the level of the constant drive current varies in response to variations in the indicated dimming level.

In another embodiment of the present invention, a method of responding to a dimmer signal and supplying a constant voltage and variable drive current to a light source includes receiving an alternating current, phase modulated dimmer input voltage. A phase delay of the dimmer input voltage indicates a dimming level; generating one or more control signals for a power factor converter and drive system to control power factor correction and to vary the drive current in conformance with the dimming level represented by the dimmer signal. The drive current is approximately constant throughout a cycle of the phase modulated input signal for each dimming level and the level of the constant drive current is varied in response to variations in the indicated dimming level.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A lighting source ballast utilizes switching and control technology to convert an alternating current (AC) phase modulated dimmer input voltage into an approximately constant drive current to illuminate one or more light emitting diodes (LED(s)). In at least one embodiment, the state of the drive current conforms to a phase delay of the input voltage to facilitate, for example, dimming. The phase delay of the input voltage indicates a particular dimming level. The drive current varies for different dimming levels. However, the light source ballast controls drive current so that the drive current is approximately constant for each dimming level throughout the cycle of an input sine wave of the AC dimmer input voltage. In at least one embodiment, the ballast emulates a resistive load and, thus, the ballast has an approximately unity power factor. The switching frequency of one or more switches can be modified to spread the spectrum of electromagnetic radiation generated by the ballast.

Figure 1:
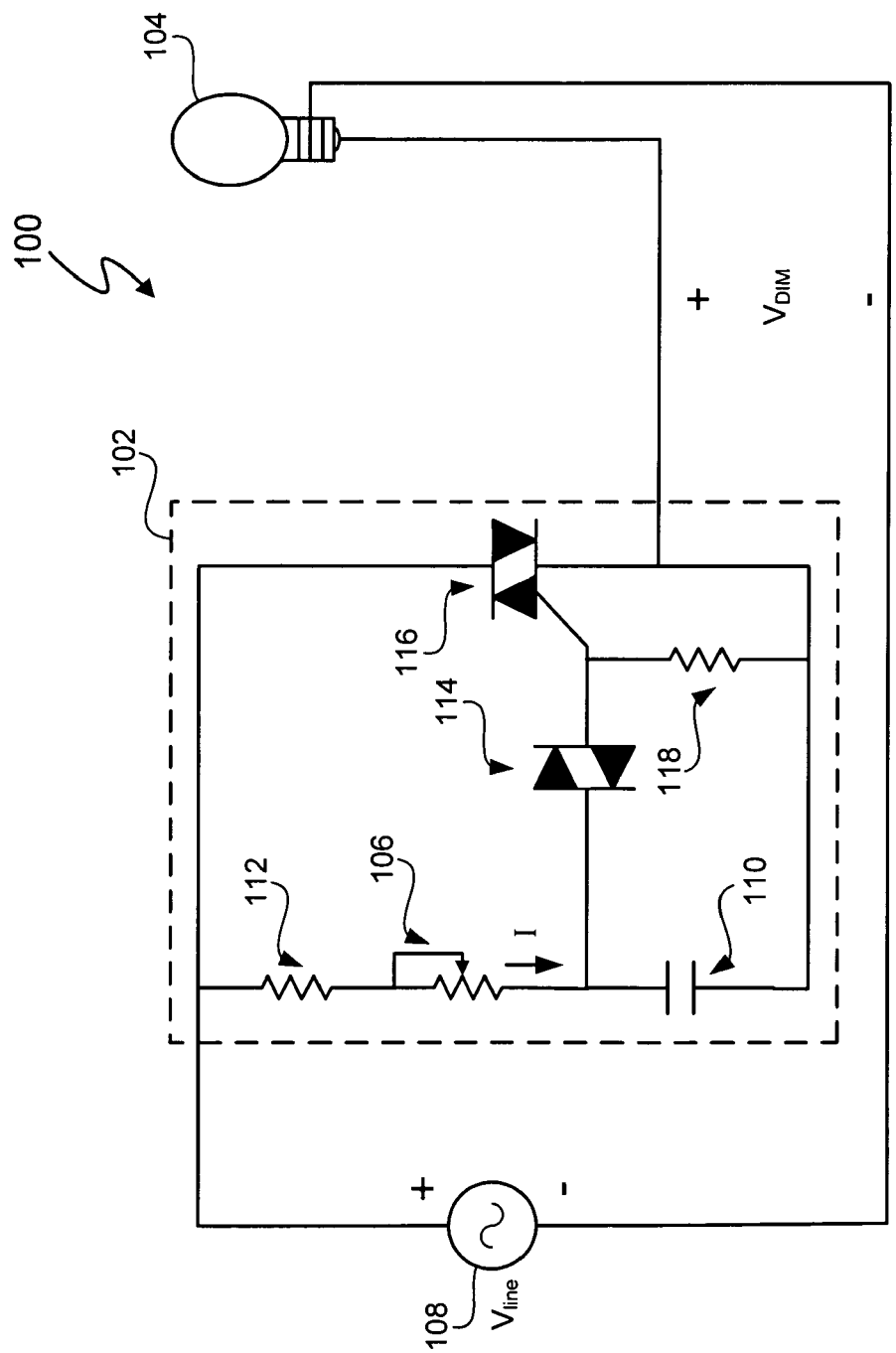
FIG. 1 (labeled prior art) depicts a lighting circuit with a conventional dimmer for dimming an incandescent light source.
Figure 2:
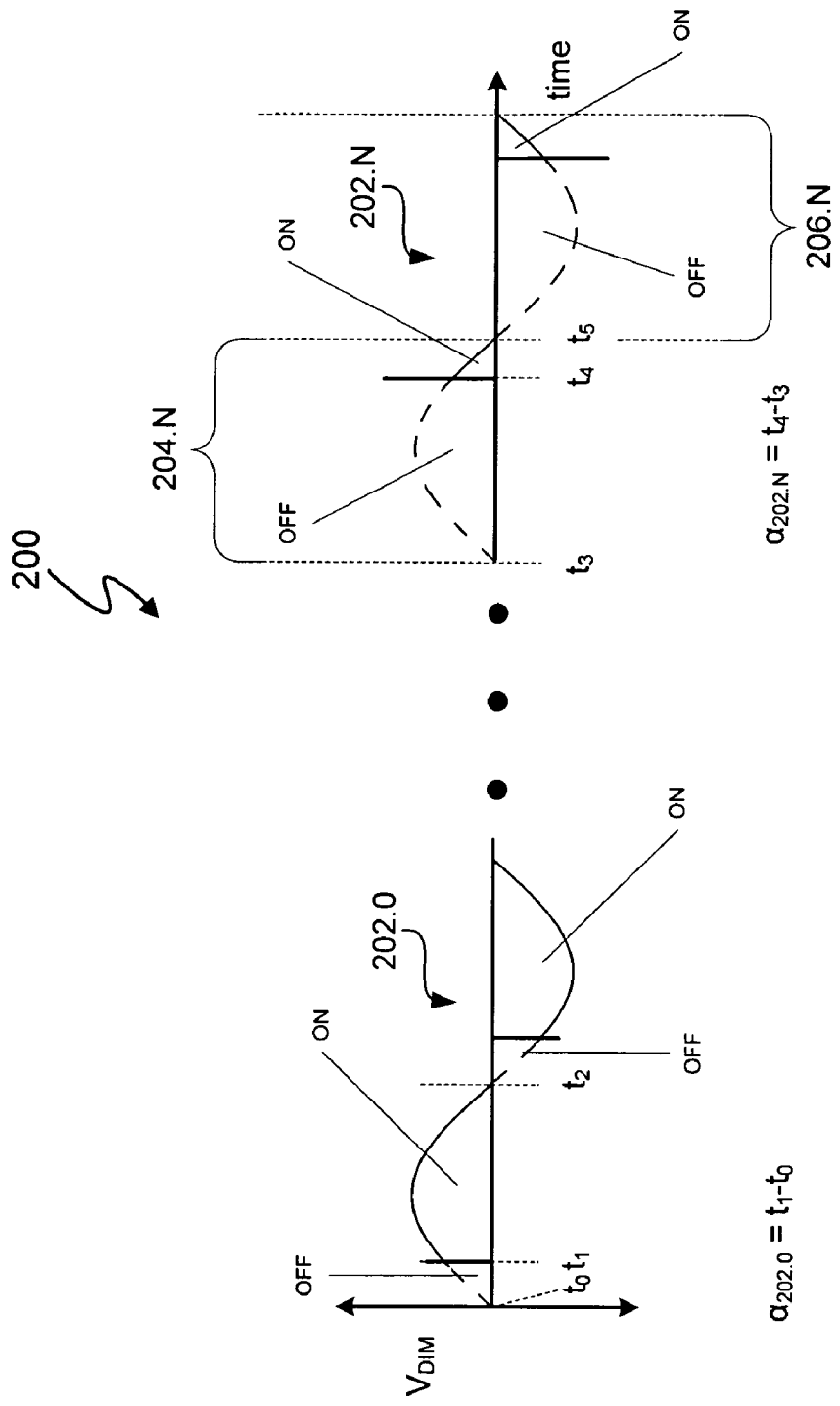
FIG. 2 (labeled prior art) depicts a dimmer circuit output voltage waveform.
Figure 3:
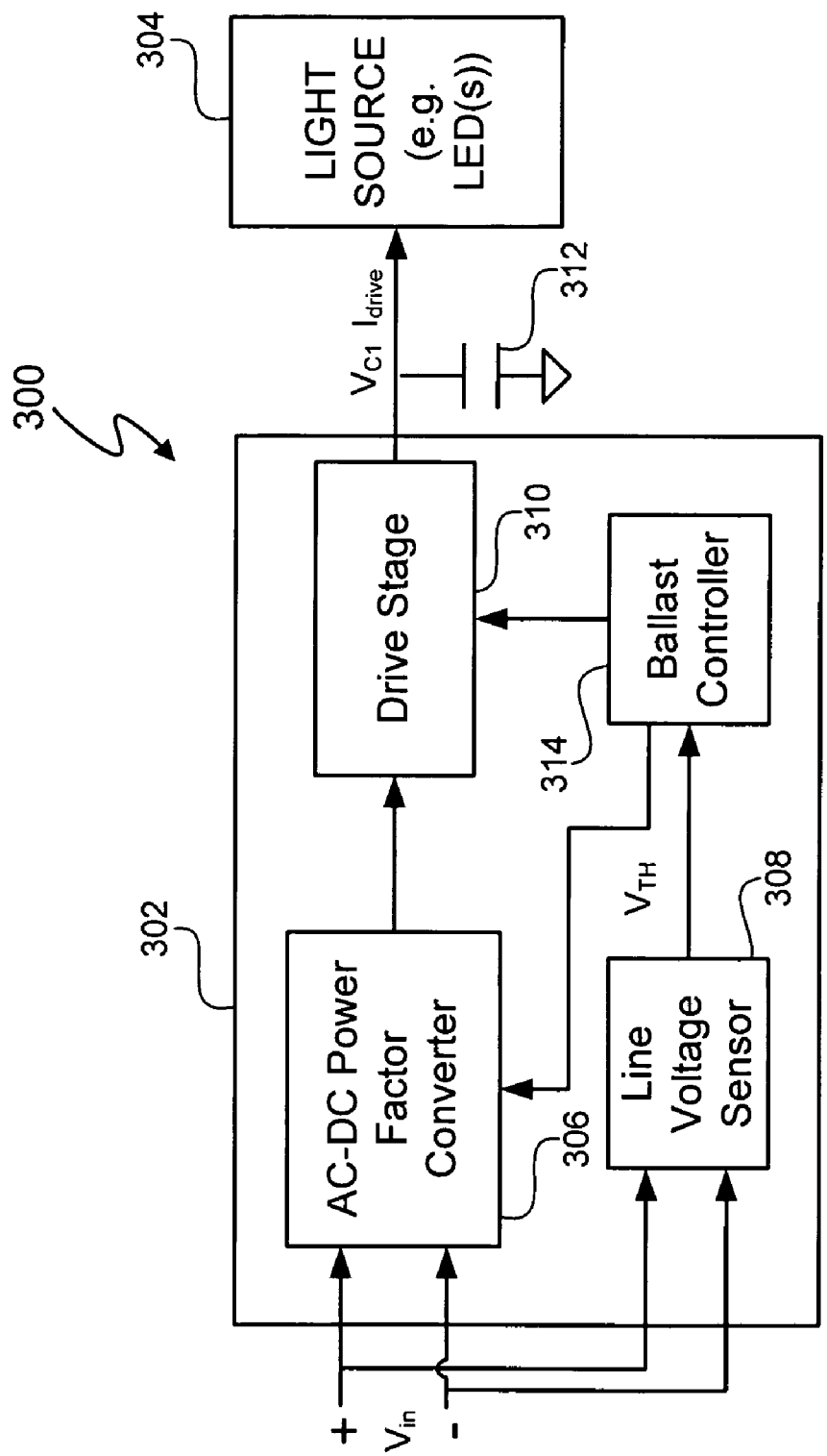
FIG. 3 depicts a lighting circuit with an electronic ballast for providing power to an LED light source.

FIG. 3 depicts a lighting circuit 300 with an electronic LED ballast 302. The electronic ballast 300 converts an alternating current (AC), phase modulated input voltage $V_{in}$ into a drive current $I_{drive}$ for light source 304. The phase modulated input current $V_{in}$ is a phase modulated dimmer signal that can be generated using any device that generates a phase modulated, AC input voltage. In at least one embodiment, the input voltage $V_{in}$ is the dimmer output voltage $V_{DIM}$ (FIGS. 1 and 2). In at least one embodiment, the light source 304 includes one or more individual LEDs or one or more groups of intraconnected LEDs. The AC-DC power factor converter 306 converts the phase modulated AC input voltage $V_{in}$ into a voltage $V_{C1}$ across hold-up capacitor 312. In at least one embodiment, voltage $V_{C1}$ is an approximately constant value over time and, thus, approximates a DC voltage.

A line voltage sensor 308 samples the input voltage $V_{in}$ over time. The line voltage sensor 308 samples the input voltage $V_{in}$ at a frequency sufficient to detect the phase delay of input voltage $V_{in}$. By detecting the phase delay of input voltage $V_{in}$, the line voltage sensor 308 detects the dimming level indicated by input voltage $V_{in}$. The line voltage sensor 308 generates a dimmer output signal $V_{TH}$ that represents the dimming level indicated by the phase delay of the input voltage $V_{in}$. It is possible, and straightforward, to dim the LED(s) 422 by turning the LEDs 422 off when the input voltage $V_{in}$ is cutoff by a phase modulation dimmer. This cutting off unfortunately leads to a narrow dimming range and to flicker of the LED(s) 422 when dimmed. By keeping an approximately constant voltage $V_{C1}$ fed to a constant current driver, these problems can be eliminated.

The drive stage 310 and ballast controller 314 convert the detected phase delay of the input voltage $V_{in}$ into a drive current $I_{drive}$ for driving light source 304 and dimming the light source 304. The drive current $I_{drive}$ conforms to a phase delay of the input voltage $V_{in}$ and has an approximately constant value for each dimming level indicated by the input voltage $V_{in}$. In other words, variations of the phase angle of input voltage $V_{in}$ indicates different dimming levels. The drive current $I_{drive}$ also varies in response to variations in the phase angle of the input voltage $V_{in}$ and has a respective, approximately constant value for each dimming level. Thus, since the dimming level indicated by the input voltage remains constant for at least one cycle of the input voltage $V_{in}$, the drive current remains approximately constant for each cycle of the input voltage $V_{in}$ until the dimming level indicated by the input voltage $V_{in}$ changes.

By conforming to the dimming level, in at least one embodiment, the drive current $I_{drive}$ is directly proportional to the input voltage $V_{in}$. In another embodiment, the drive current $I_{drive}$ conforms to the duty cycle of the input voltage $V_{in}$ via a mapping function as, for example, described in Melanson III.

The drive stage 310 can also be referred to as a DC-DC ballast controller because the drive stage 310 converts the approximately DC voltage from the power factor converter 306 into a DC voltage and drive current for constant voltage light source 304. The drive stage 310 provides a link voltage $V_{C1}$ and drive current $I_{drive}$ to voltage light source 304 so that the power supplied by drive stage 310 is responsive to the dimming level indicated by the input voltage $V_{in}$.

In at least one embodiment, the line voltage sensor 308 senses the dimming level indicated by the input voltage $V_{in}$ by determining the duty cycle, phase angle, and/or phase delay of the input voltage $V_{in}$ and generates a threshold voltage $V_{TH}$ that conforms to the dimming level indicated by the input signal $V_{in}$. The duty cycle, phase angle, and/or phase delay represent the dimming level indicated by the input signal $V_{in}$.

The ballast controller 314 generates control signals to control power factor correction by the AC-DC power factor converter 306 and drive stage 310. In at least one embodiment, the ballast controller 314 generates control signals for the AC-DC power factor converter 306 in accordance with the exemplary systems and methods described in Melanson V and Melanson VI. In at least one embodiment, the ballast controller 314 generates a control signal to control the generation of drive current $I_{drive}$ in accordance with the exemplary systems and methods described in Melanson IV.

As previously stated, the drive current $I_{drive}$ conforms to a duty cycle of the input voltage $V_{in}$ and has an approximately constant value for each dimming level indicated by the input voltage $V_{in}$. In at least one embodiment, the threshold voltage $V_{TH}$ is directly proportional to the dimming level indicated by input signal $V_{in}$. In at least one embodiment, the threshold signal $V_{TH}$ represents a mapping of the dimming level indicated by input voltage $V_{in}$ to predetermined values different than the dimming levels indicated by the input voltage $V_{in}$. In at least one embodiment, the mapping maps measured light levels to perception based light levels as described in conjunction with the exemplary systems and methods of Melanson I and Melanson II.

Figure 4A:
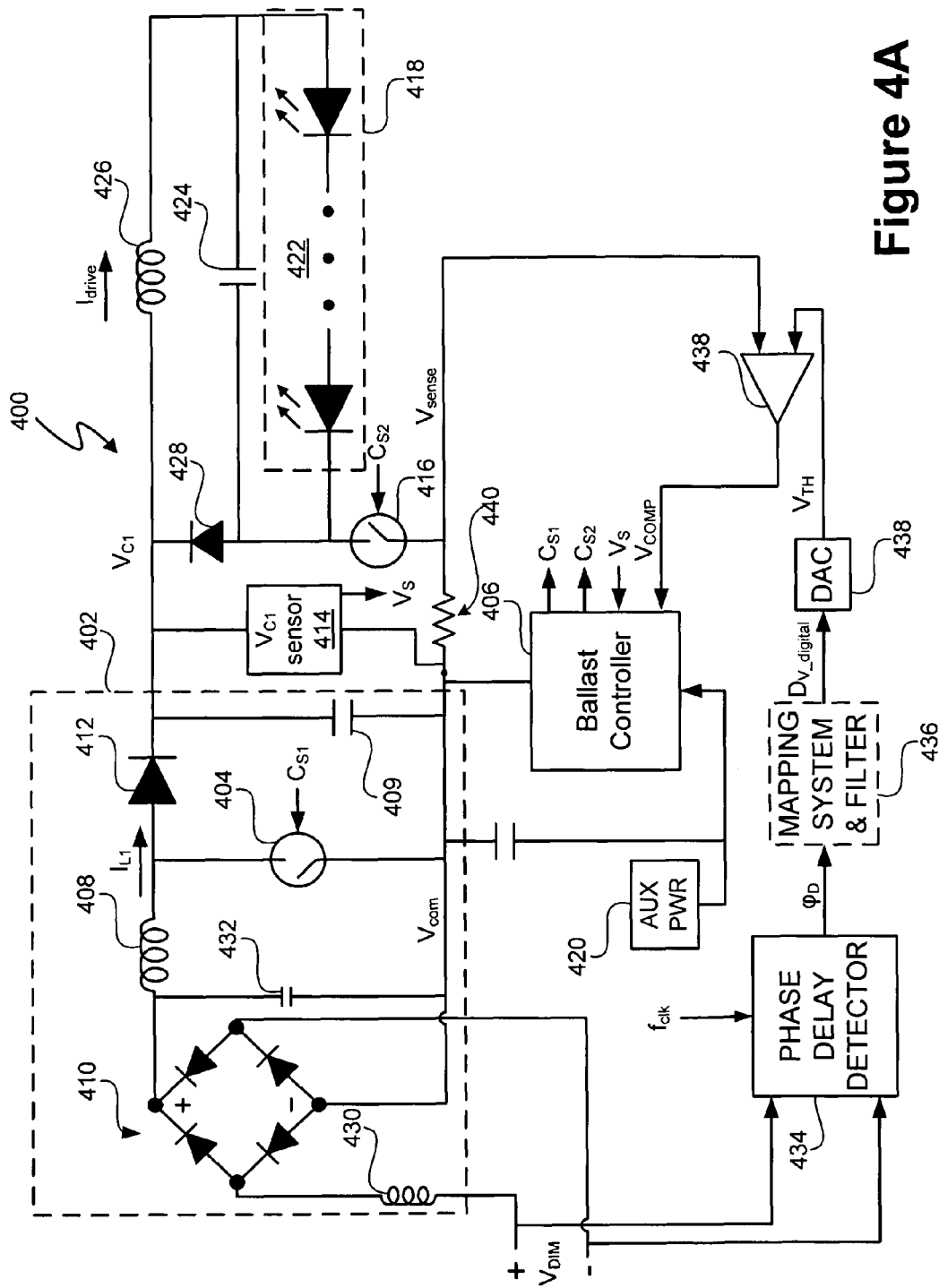
FIG. 4A depicts a lighting circuit.

FIG. 4A depicts a lighting circuit 400, which is one embodiment of lighting circuit 300. Lighting circuit 400 includes an AC-DC power factor converter 402 to convert an AC, phase modulated, input voltage dimmer signal $V_{DIM}$ into an approximately constant light source drive current $I_{drive}$. The dimmer signal $V_{DIM}$ can be generated using any phase modulation dimmer circuit, such as the dimmer 102 (FIG. 1). The AC-DC switching power converter 402 includes a switch 404 that turns 'on' (conducts) and turns 'off' (nonconductive) in response to a control signal $C_{S1}$ generated by ballast controller 406. When switch 404 is 'on', inductor 408 energizes with the current $I_{L1}$ from the full-bridge diode rectifier 410. When switch 404 is 'off', the inductor 408 drives current $I_{L1}$ through diode 412 to charge capacitor 409. The control signal $C_{S1}$ varies the duty cycle of switch 404 so that the direct current (DC) voltage on storage capacitor 409 averages to a desired value of raw DC voltage $V_{C1}$. In at least one embodiment, link voltage $V_{C1}$ has an average value in the range of 200 V to 400 V. Ballast controller 406 controls the duty cycle of switch 404 such that current $I_{L1}$ is proportional to the input voltage $V_x(t)$. In at least one embodiment, switch 404 is an N-channel field effect transistor (FET), and control signal $C_{S1}$ is a gate voltage.

Ballast controller 406 controls the timing of switches 404 and 416 and, thus, controls the voltage $V_{C1}$ and current $I_{drive}$. The voltage $V_{C1}$ is controlled to remain approximately constant over time, and drive current $I_{drive}$ is approximately constant for each dimming level indicated by the threshold voltage $V_{TH}$. The drive current $I_{drive}$ is a drive current for LED(s) 422. The current $I_{drive}$ is controlled so as to be responsive to dimmer signal $V_{DIM}$ and to dim light source 418 in accordance with, for example, the dimming level indicated by dimmer signal $V_{DIM}$. In at least one embodiment, the current $I_{drive}$ is controlled so that the intensity of the LEDs of light source 418 conforms to a mapping function as, for example, described in Melanson and Melanson II. In at least one embodiment, the light circuit includes an auxiliary power supply 420 to supply power to ballast controller 406. In at least one embodiment, switch 416 is also an N-channel FET, and control signal $C_{S2}$ is a gate voltage. In another embodiment, switch 416 is a bipolar junction transistor with control signal $C_{S2}$ providing current to the base of the transistor. In at least one embodiment, the switching frequencies of switch 404 and/or switch 416 are greater than an upper audio baseband frequency, e.g. greater than 25 kHz. Ballast controller 406 can generate control signal $C_{S2}$ in any of a variety of ways. Melanson IV describes an exemplary system and method for generating control signal $C_{S2}$.

Figure 4B:
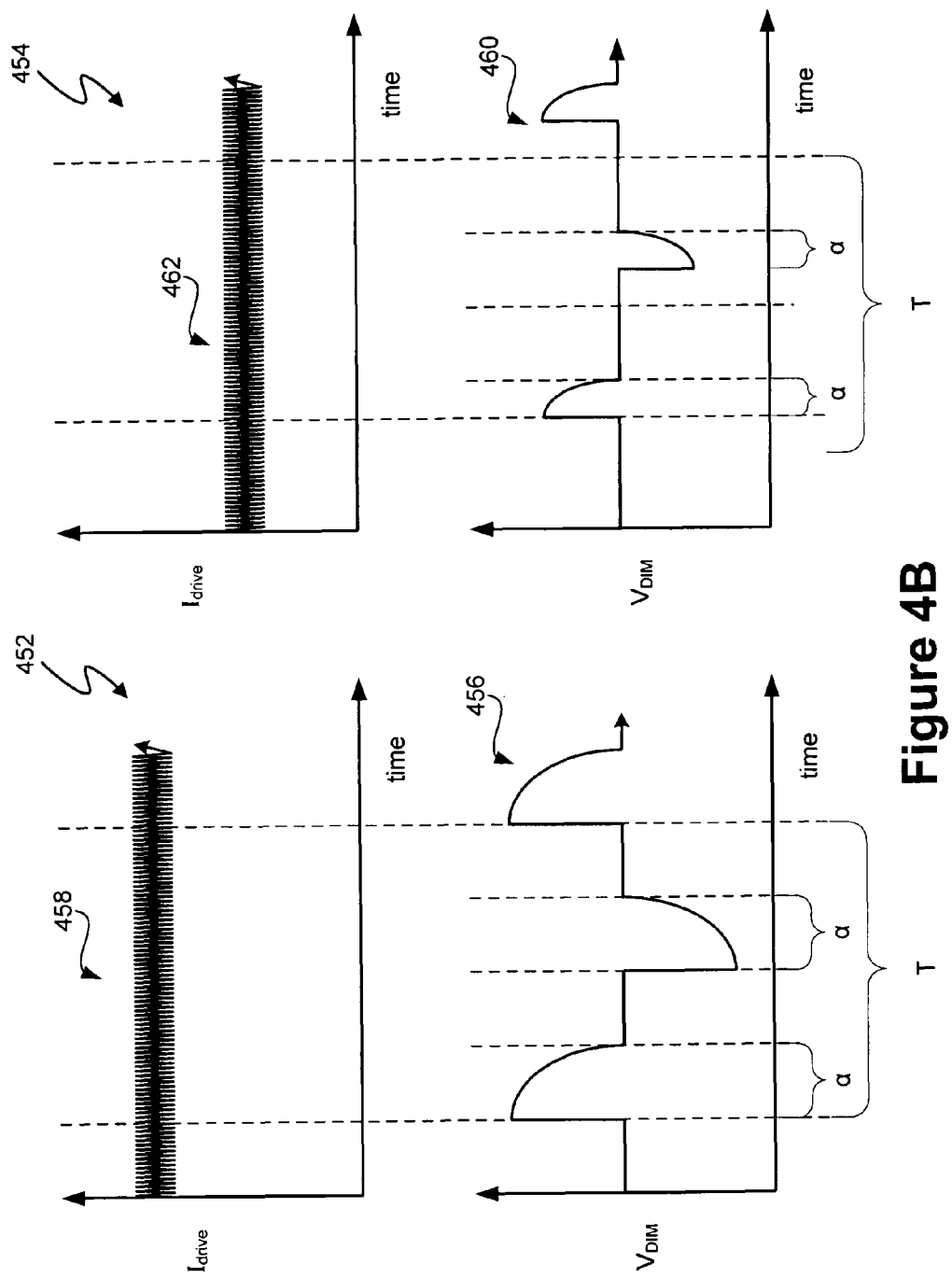
FIG. 4B depicts graphical relationships between a drive current and various dimming levels indicated by a dimmer signal.
Figure 4C:
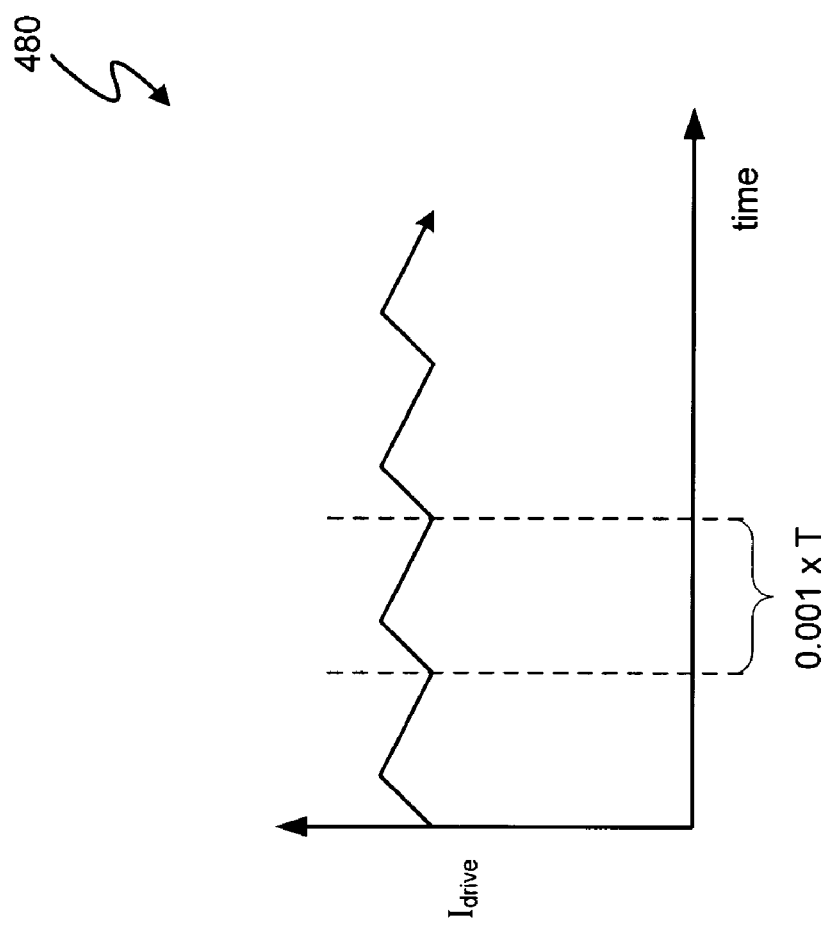
FIG. 4C depicts a magnified view of the drive current of FIG. 4B.

Lighting source 418 includes one or more LED(s) 422. The LED(s) 422 can be any type of LED including white, amber, other colors, or any combination of LED colors. Additionally, the LED(s) 422 can be configured into any type of physical arrangement, such as linearly, circular, spiral, or any other physical arrangement. In at least one embodiment, each of LED(s) 422 is serially connected. Capacitor 424 is connected in parallel with LED(s) 422 and provides filtering to protect the LED(s) 422 from AC signals. Inductor 426 stores energy from LED current $I_{drive}$ to maintain an approximately constant current $I_{drive}$, for a given dimming level indicated by the threshold voltage $V_{TH}$, when switch 416 conducts. Diode 428 prevents reverse current flow when the polarity of inductor 426 reverses during switching of switch 416. A typical switching frequency for this approximately constant-current $I_{drive}$ would be 50 kHz-100 kHz. The frequency is chosen to optimize efficiency and minimize size of a switch 416. The ripple of the current $I_{drive}$ (as shown in FIGS. 4B and 4C) at the switching frequency is selected to be about 10-20% at full intensity, again chosen for efficiency and size of switch 416. This remaining high-frequency ripple has minimal effect on the performance of the LEDs, and is herein referred to as "approximately constant current". This is contrasted with pulse-width modulation at 120 Hz, which has detrimental effects on flicker and efficiency.

To reduce radio frequency interference, the timing of conductive transitions (i.e. "on" and "off" times) of switches 404 and 416 can be modified with respect to each other and also dithered to spread the spectrum of electromagnetic energy and, thus, minimize radio frequency interference. Dithering can be accomplished, for example, by modifying the "off" time of switch 404 with a random or pseudo random noise source. Inductor 430 and capacitor 432 provide filtering to smooth drive current $I_{L1}$ so that the average drive current $I_{L1}$ is sinusoid in phase with dimmer signal $V_{DIM}$. Thus, a power factor of unity or approximately unity is achieved.

The lighting system 400 includes a phase delay detector 434, an optional mapping system and filter 436, and a digital-to-analog converter (DAC) 438 to generate a threshold voltage $V_{TH}$. The threshold voltage $V_{TH}$ is a dimmer output signal indicating a dimming level conforming to a dimming level indicated by the dimmer signal $V_{DIM}$. In at least one embodiment, the phase delay detector 434 detects the phase delay, duty cycle, and/or the corresponding phase angle of the dimmer signal $V_{DIM}$ and generates a phase delay signal $\square_D$. In at least one embodiment, the lighting system 400 includes a mapping system and filter 436 that uses a mapping function to map the dimming level indicated by phase delay signal $\square_D$ into different dimming levels. In at least one embodiment, the mapping function converts the dimming levels indicated by dimmer signal $V_{DIM}$ (and, thus, indicated by phase delay signal $\square_D$) into a digital dimming signal $D_{V\_digital}$ having values that map measured light levels to perception based light levels as described in conjunction with the exemplary systems and methods of Melanson I and Melanson II. DAC 438 converts the mapped dimmer signal $D_{V\_digital}$ into the threshold voltage $V_{TH}$. In at least one embodiment, the phase delay signal $\square_D$ is a digital signal. DAC 438 converts the digital phase delay signal $\square_D$ into an analog threshold voltage $V_{TH}$. In at least one embodiment, the threshold voltage $V_{TH}$ is updated at least the same frequency as the frequency of dimmer signal $V_{DIM}$. This update is desirable, as the phase modulated dimmer signal $V_{DIM}$ operates only over a narrow range (<10:1), whereas it is desirable to dim over a wide range, say 100:1.

The threshold voltage $V_{TH}$ is compared by comparator 438 with voltage $V_{sense}$. Voltage $V_{sense}$ is taken across sense resistor 440 and is proportional to drive current $I_{drive}$. In at least one embodiment, resistor 440 is 1 ohm. In another embodiment, the drive current $I_{drive}$ is sensed by a magnetic current sensor in the proximity of current flowing through inductor 426. The comparator 438 provides an output voltage $V_{COMP}$ as input data to ballast controller 406. The output voltage $V_{COMP}$ is used by ballast controller 406 to control the conductivity of switch 416 and, thus, control drive current $I_{drive}$ as, for example, described in Melanson IV. The conductivity of switch 416 is modulated by the control signal $C_{S2}$ provided by ballast controller 406 such that the average drive current $I_{drive}$ is responsive to dimmer signal $V_{DIM}$. The drive current $I_{drive}$ serves as the drive current for light source 418. Adjusting the drive current $I_{drive}$ modifies the intensity of light source 418.

FIG. 4B depicts a graphical relationship 452 between an approximately constant LED drive current $I_{drive}$ and a phase modulated dimmer signal $V_{DIM}$ indicating a 50% dimming level and a graphical relationship 454 between an approximately constant LED drive current $I_{drive}$ that is varied to respond to a phase modulated dimmer signal $V_{DIM}$ indicating a 25% dimming level. The dimmer signal $V_{DIM}$ 456 has phase delays α of T/4 representing a dimming level of 50%, where T is the period of a full cycle of dimmer signal $V_{DIM}$ 456. In at least one embodiment, T is 1/60 (16.7 msec) or 1/50 (20 msec). Lighting system 400 generates an LED drive current $I_{drive}$ 458 that is approximately constant during each cycle of dimmer signal $V_{DIM}$ 406. The dimmer signal $V_{DIM}$ 460 changes from the dimming level of 50% indicated by dimmer signal $V_{DIM}$ 456 to a dimming level of 25%. The phase delay of dimmer signal $V_{DIM}$ 460 is T/8. Lighting system 400 generates an LED drive current $I_{drive}$ 462 that is approximately constant during each cycle of dimmer signal $V_{DIM}$ 460. Thus, the LED drive current $I_{drive}$ varies with variations of the dimming level indicated by dimmer signal $V_{DIM}$, and LED drive current $I_{drive}$ remains approximately constant for each dimming level indicated by dimmer signal $V_{DIM}$. The LED drive current $I_{drive}$ changes in response to other dimming levels indicated by dimmer signal $V_{DIM}$ in the same manner as depicted in FIG. 4B.

FIG. 4C depicts a 1,000× magnified view 480 of LED drive currents $I_{drive}$ 458 and 462. The LED drive currents $I_{drive}$ 458 and 462 rise and fall in accordance with pulses of control signal $CS_2$. For each dimming level, the peak-to-peak values of the LED drive current $I_{drive}$ is, for example, 100-200 mA, which is approximately constant for LED lighting applications. The average value of the LED drive current $I_{drive}$ represents a DC offset of the LED drive current $I_{drive}$. The DC offset of the LED drive current $I_{drive}$ represents the dimming level of the LEDs 418.

Figure 5A:
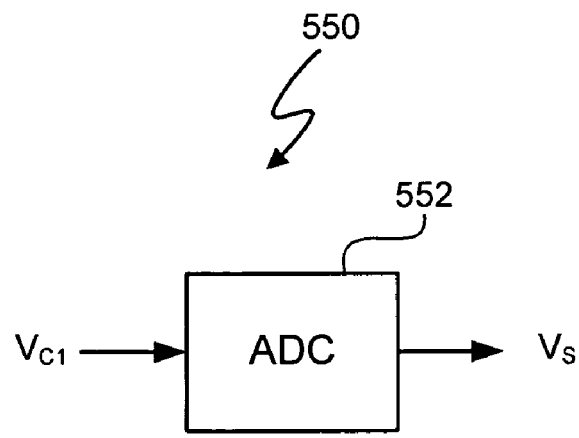
FIG. 5A depicts a voltage sensor.

FIG. 5A depicts an exemplary voltage sensor 550, which is one embodiment of $V_{C1}$ sensor 414. The voltage sensor 550 is an analog-to-digital converter (ADC) 552 that generates a digital value $V_S$ representing the voltage $V_{C1}$.

Figure 5B:
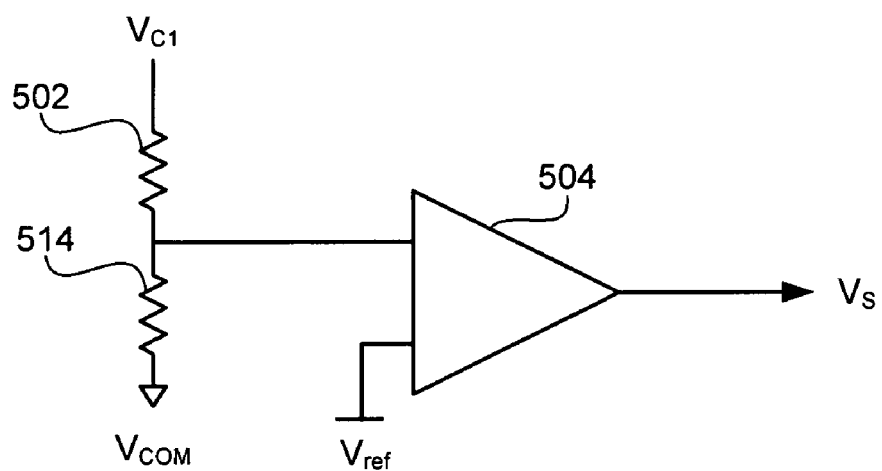
FIG. 5B depicts a specific embodiment of the voltage sensor in FIG. 5A.

FIG. 5B represents an exemplary voltage sensor 500, which represents one embodiment of the ADC 552. Resistors 502 and 514 provide a voltage divider to compare a percentage X of voltage $V_{C1}$ to a reference voltage $V_{REF}$. The reference voltage $V_{REF}$ is chosen to be the same percentage X as the desired value of voltage $V_{C1}$. In one embodiment, the desired value of voltage $V_{C1}$ is 250 V, and the reference voltage is 1 V. So the ratio of resistor 502 to resistor 514 is 250:1. In one embodiment, the value of resistor 502 is 2.5 Mohms, and the value of resistor 514 is 10 kohms. The comparator 504 provides an output voltage $V_S$. When voltage $V_S$ is high, voltage $V_{C1}$ is high, so the switching frequency of switch 404 is decreased to decrease the voltage $V_{C1}$. When voltage $V_S$ is low, voltage $V_{C1}$ is high, so the switching frequency of switch 404 is increased to increase the voltage $V_{C1}$.

Figure 6:
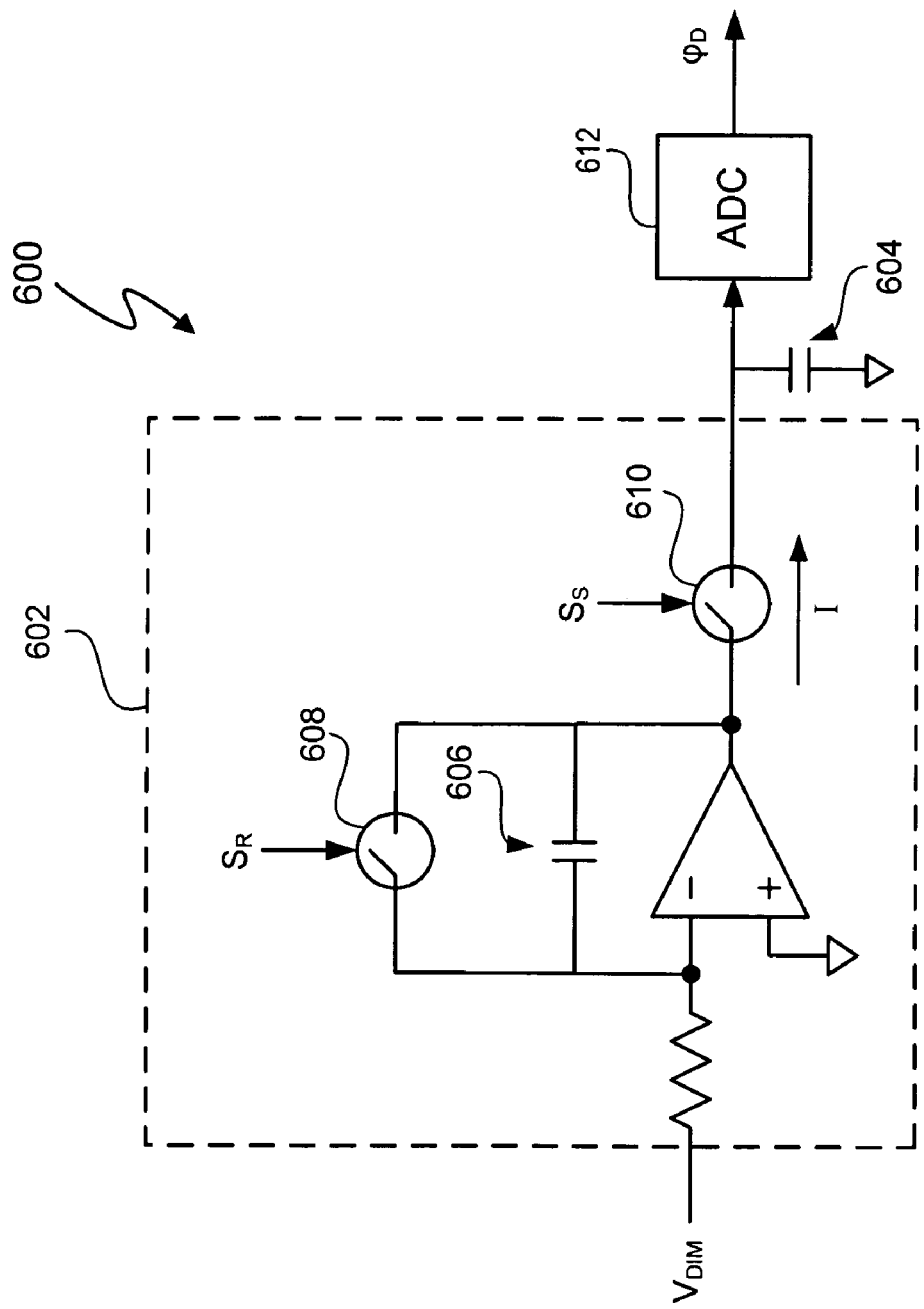
FIG. 6 depicts a phase delay detector

FIG. 6 depicts a phase delay detector 600, which represents one embodiment of phase delay detector 434. The phase delay detector 600 includes an analog integrator 602 that integrates dimmer signal $V_{DIM}$ during each cycle (full or half cycle) of dimmer signal $V_{DIM}$. The analog integrator 602 generates a current I corresponding to the duty cycle of dimmer signal $V_{DIM}$ for each cycle of dimmer signal $V_{DIM}$. The current provided by the analog integrator 602 charges a capacitor 604 to a value representing the phase delay of dimmer signal $V_{DIM}$. The ADC 612 generates the phase delay signal $\square_D$ from the voltage across capacitor 604. The analog integrator 602 can be reset after each cycle of dimmer signal $V_{DIM}$ by discharging capacitors 606 and 604. Switch 608 includes a control terminal to receive reset signal $S_R$. Switch 610 includes a control terminal to receive sample signal $S_S$. The charge on capacitor 604 is sampled by capacitor 606 when control signal $S_S$ causes switch 610 to conduct. After sampling the charge on capacitor 604, reset signal $S_R$ opens switch 608 to discharge and, thus, reset capacitor 604. In at least one embodiment, switches 608 and 610 are n-channel field effect transistors, and sample signal $S_S$ and reset signal $S_R$ have non-overlapping pulses. In at least one embodiment, each cycle of dimmer signal $V_{DIM}$ can be detected by every other zero crossing of dimmer signal $V_{DIM}$.

Figure 7:
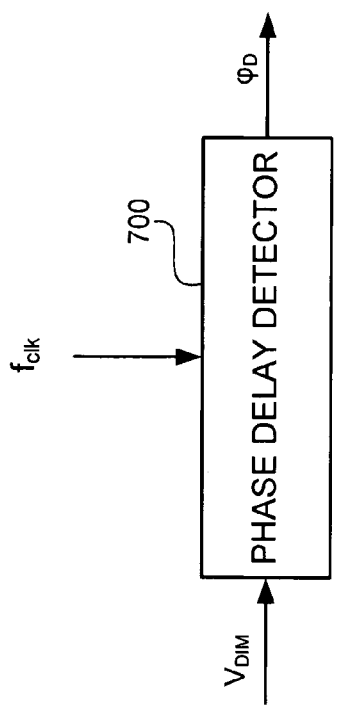
FIG. 7 depicts another phase delay detector.

FIG. 7 depicts a phase delay detector 700 that converts the dimmer input signal $V_{DIM}$ into a digital dimmer signal value $\square_D$. The digital data of dimmer signal value $\square_D$ represents the phase delay of dimmer signal $V_{DIM}$. The phase delay detector 700 determines the duty cycle of dimmer signal $V_{DIM}$ by counting the number of cycles of clock signal $f_{clk}$ that occur until the chopping point of dimmer signal $V_{DIM}$ is detected by the duty cycle time converter 700.

Figure 8:
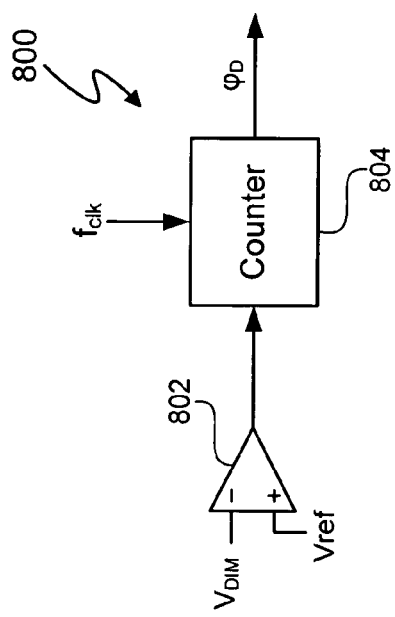
FIG. 8 depicts a phase delay detector.

FIG. 8 depicts a phase delay detector 800 that represents one embodiment of phase delay detector 800. Comparator 802 compares dimmer signal $V_{DIM}$ against a known reference. The reference is generally the cycle cross-over point voltage of dimmer output voltage $V_{DIM}$, such as a neutral potential of a household AC voltage. The counter 804 counts the number of cycles of clock signal $f_{clk}$ that occur until the comparator 802 indicates that the chopping point of dimmer signal $V_{DIM}$ has been reached. Since the frequency of dimmer signal $V_{DIM}$ and the frequency of clock signal $f_{clk}$ is known, the phase delay can be determined from the count of cycles of clock signal $f_{clk}$ that occur until the comparator 802 indicates that the chopping point of dimmer signal $V_{DIM}$. Likewise, the phase angle can also be determined by knowing the elapsed time from the beginning of a cycle of dimmer signal $V_{DIM}$ until a chopping point of dimmer signal $V_{DIM}$ is detected.

Figure 9:
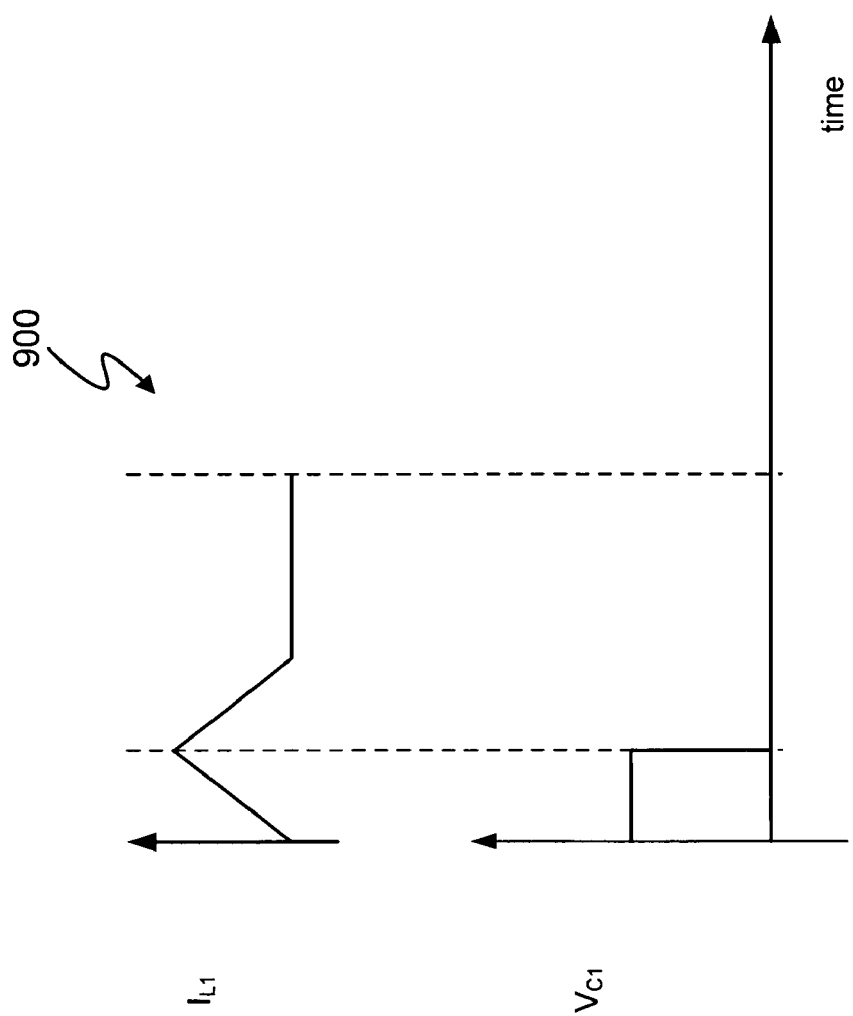
FIGS. 9-11 depict graphical relationships between various control signals, sense signals, and drive currents.

FIG. 9 depicts a graphical relationship 900 in time between the switch 404 control signal $CS_1$ and drive current $I_{L1}$. When control signal $CS_1$ causes switch 404 to conduct, drive current $I_{L1}$ ramps up. When control signal $CS_1$ causes switch 404 to turn "off", drive current $I_{L1}$ ramps down. Thus, in this embodiment, the drive current $I_{L1}$ is controlled by pulse width modulation. The period of control signal $CS_1$ is a matter of design choice and is preferably chosen to avoid audio baseband frequencies.

Figure 10:
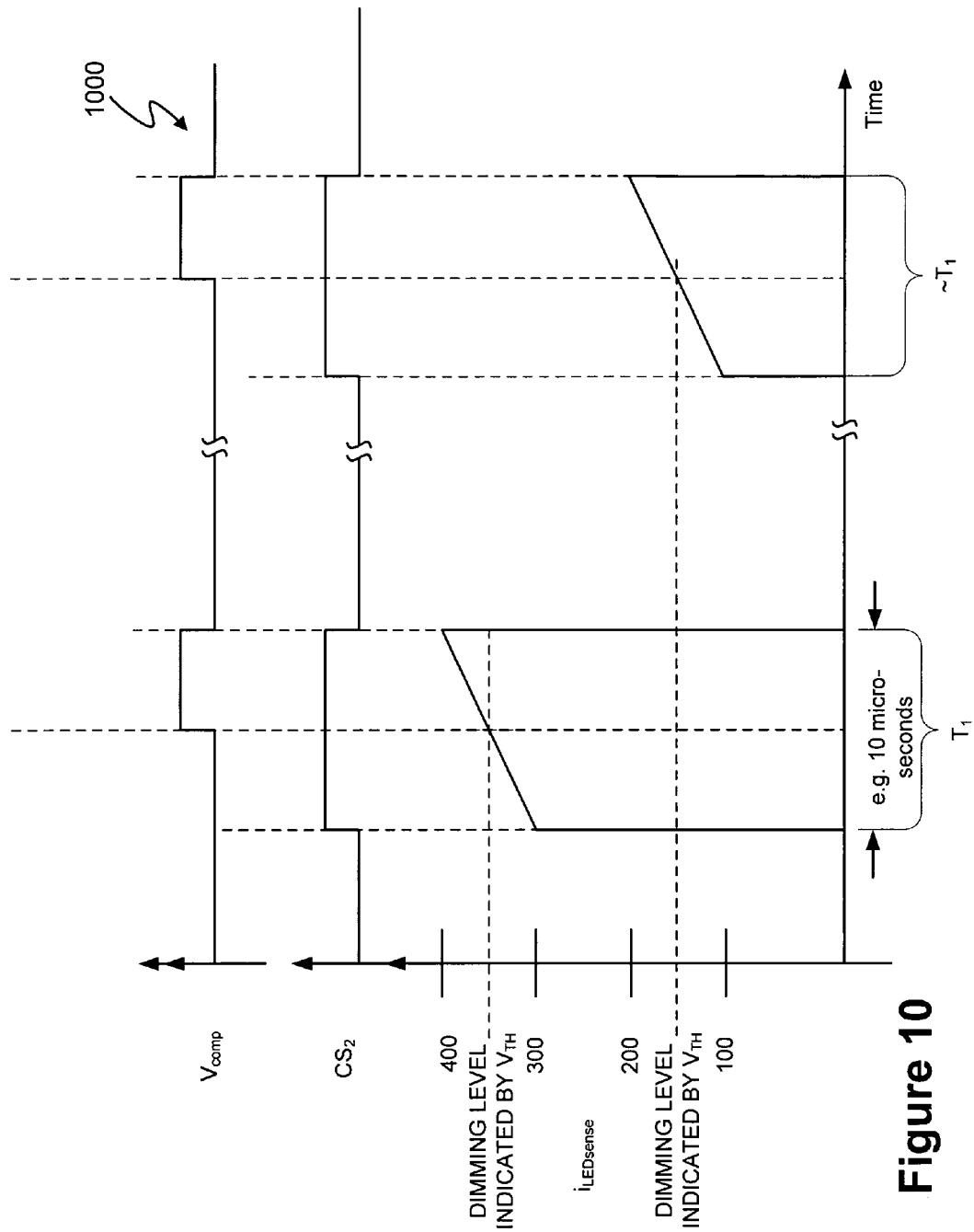

FIG. 10 depicts a graphical relationship 1000 between the comparator voltage $V_{COMP}$, control signal $C_{S2}$, and current $I_2$ across sense resistor 440 (FIG. 4). When control signal $C_{S2}$ is high, switch 416 conducts, and drive current $I_{drive}$ increases. When the comparator voltage $V_{COMP}$ goes high, ballast controller 406 keeps control signal $C_{S2}$ high until the comparator voltage $V_{COMP}$ goes low again. In another embodiment, the control signal $C_{S2}$ goes high when comparator voltage $V_{COMP}$ goes high, and ballast controller 406 keeps control signal $C_{S2}$ high for twice as long as the amount of time that comparator voltage $V_{COMP}$ is high. In this manner, the average drive current $I_{drive}$ is responsive to the dimmer signal $V_{DIM}$, and, thus, the intensity of light source 418 is also responsive to dimmer signal $V_{DIM}$.

Figure 11:
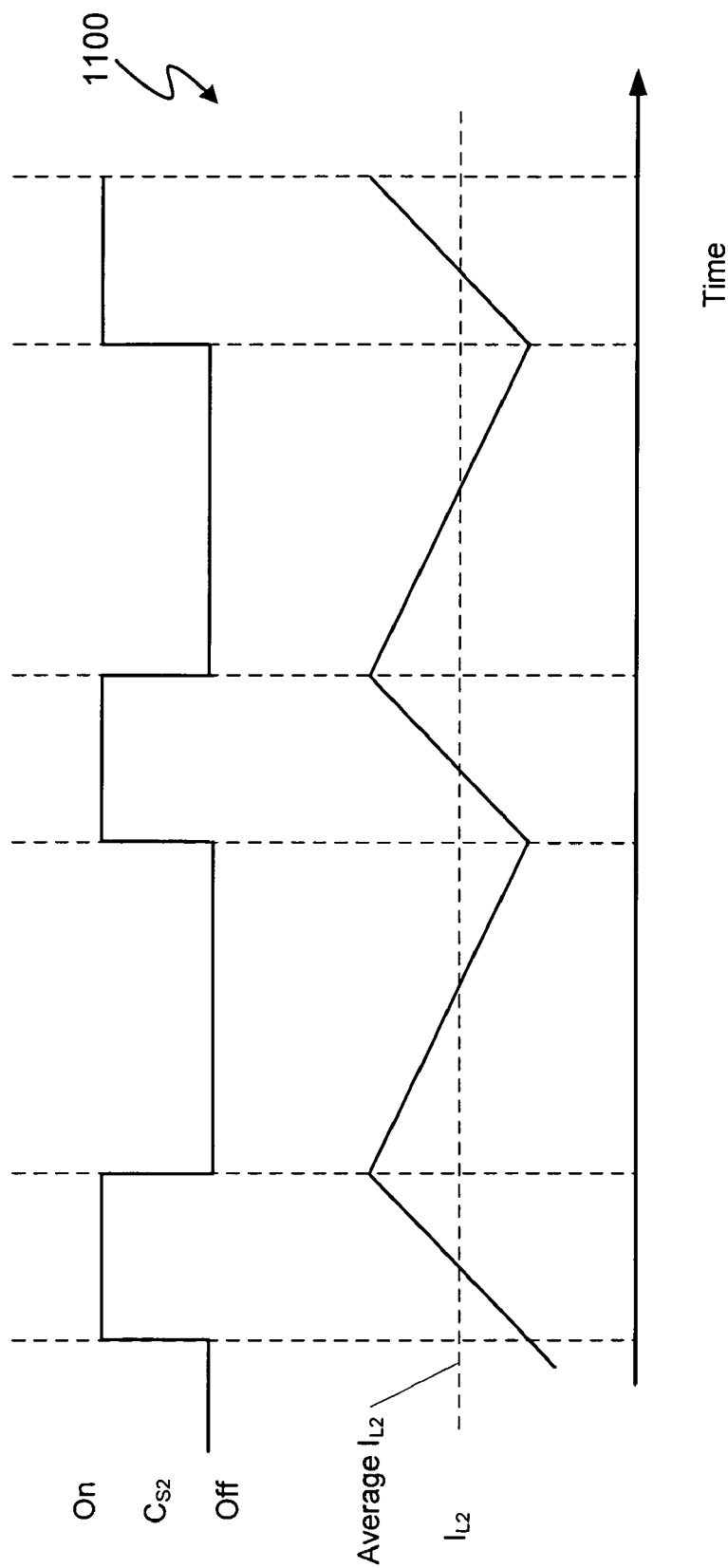

FIG. 11 depicts a graphical relationship 1100 between control signal $C_{S2}$ and drive current $I_{drive}$. The drive current $I_{drive}$ ramps up when control signal $C_{S2}$ is high (i.e. causes switch 416 to conduct) and ramps down when control signal $C_{S2}$ is low (i.e. causes switch 416 to turn 'off'). The average drive current $I_{drive}$ tracks the dimmer signal $V_{DIM}$ either directly or via a mapping function. The intensity of light source 418 is approximately directly proportional to the driving drive current $_{drive}$.

Figure 12:
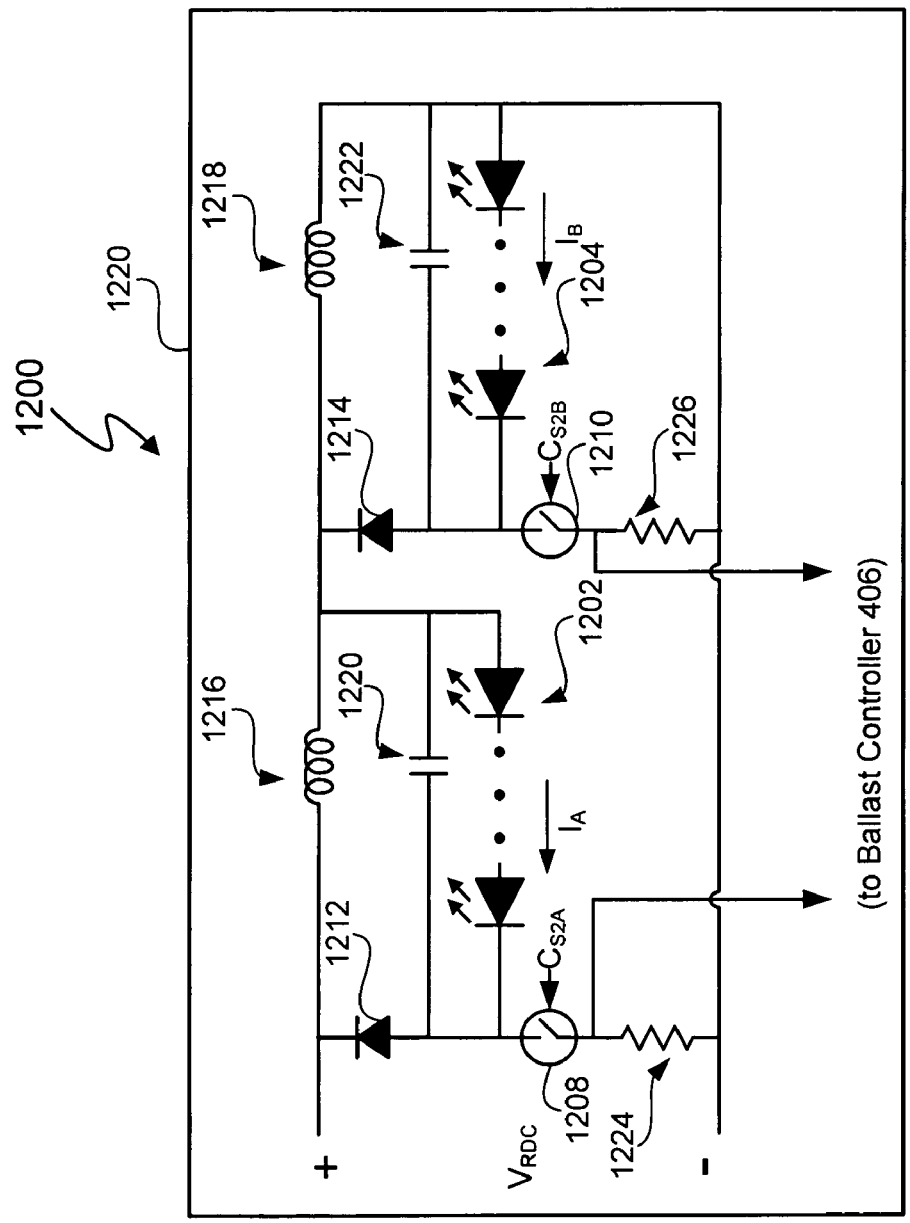
FIG. 12 depicts an LED bank.

FIG. 12 depicts an LED bank 1200, which represents a substitution of light source 418. The raw DC voltage $V_c2$ is applied across the series connected LEDs 1202 and the LEDs 1204. Ballast controller 406 supplies control signals $C_{S2A}$ and $C_{S2B}$ to turn respective switches 1208 and 1210 'on' (conductive) and 'off' (nonconductive). In at least one embodiment, switches 1208 and 1210 are n-channel field effect transistors (FETs). In this embodiment, ballast controller 406 provides the gate voltages to switches 1208 and 1210. The average values of the drive currents $I_A$ and $I_B$ control the respective intensity of LEDs 1202 and 1204. The diodes 1212 and 1214 permit current flow in only one direction. Inductors 1216 and 1218 and capacitors 1220 and 1222 regulate the voltage across the respective LEDs 1202 and LEDs 1204 and provide filtering. The voltage across resistors 1224 and 1226 is fed back to ballast controller 406 to allow ballast controller 406 to adjust the switching frequency of switches 1208 and 1210 and, thus, correlate drive currents $I_A$ and $I_B$ with the selected dimming level. The type, number, and arrangement of LEDs in LED bank 1200 is a matter of design choice and depends, for example, on the range of desired intensity and color temperatures of LED bank 1200.

Thus, a lighting source ballast utilizes switching and control technology to convert an alternating current (AC) phase modulated dimmer input voltage into an approximately constant drive current to illuminate one or more light emitting diodes (LED(s)). In at least one embodiment, the state of the drive current conforms to a phase delay of the input voltage to facilitate, for example, dimming. The phase delay of the input voltage indicates a particular dimming level. The drive current varies for different dimming levels. However, the light source ballast controls drive current so that the drive current is approximately constant for each dimming level. In at least one embodiment, the ballast emulates a resistive load and, thus, the ballast has an approximately unity power factor. The switching frequency of one or more switches can be modified to spread the spectrum of electromagnetic radiation generated by the ballast. The light sources can be configured in any of a variety of configurations, such as multiple LED banks. In at least one embodiment, the ballast emulates a resistive load and, thus, the ballast has an approximately unity power factor. Additionally, the switches can be timed to spread the spectrum of electromagnetic radiation generated by the ballast.

Although the present invention has been described in detail, it should be understood that various changes, substitutions and alterations can be made hereto without departing from the spirit and scope of the invention as defined by the appended claims.

What is claimed is:

1. A lighting system ballast comprising:
    a light source driver stage configured to deliver power to one or more light emitting diodes with an adjustable drive current;
    a sensor having one or more input terminals to receive a phase modulated dimmer signal, wherein a phase delay of the phase modulated dimmer signal indicates a dimming level and the sensor is configured to detect the dimming level and to generate a dimmer output signal representing a dimming level indicated by the dimmer signal; and
    a controller coupled to the light source driver stage and the sensor, wherein the controller includes at least one input terminal to receive the dimmer output signal from the sensor and to generate a drive control signal to cause a drive current supplied to each light emitting diode to dim each light emitting diode in response to the dimmer signal, wherein the drive current is approximately constant for each dimming level throughout a cycle of the phase modulated dimmer signal.

2. The lighting system ballast of claim 1 wherein the phase modulated dimmer signal comprises a line input voltage to supply power to the light source driver stage.

3. The lighting system ballast of claim 1 further comprising:
    a switch having a control terminal coupled to the controller to receive the drive control signal and having a terminal coupled to each light emitting diode to control the drive current delivered to each light emitting diode.

4. The lighting system ballast of claim 1 further comprising a converter to convert the dimming output signal into a digital dimmer output signal.

5. The lighting system ballast of claim 1 wherein the controller is further configured to spread a spectrum of the drive control signal.

6. The lighting system ballast of claim 1 further comprising a mapping system to map the dimming level to the drive control signal using a predetermined lighting output function.

7. The lighting system ballast of claim 6 wherein the lighting output function maps dimming levels indicated by input voltage to predetermined values different than the dimming levels indicated by the input voltage.

8. The lighting system ballast of claim 1 wherein the lighting ballast system further comprises a comparator to generate a comparison signal representing an outcome of a comparison between a signal proportional to the drive current and the threshold signal, and wherein the controller is further configured to adjust the drive control signal in response to the comparison signal so that the energy supplied by the light source driver stage is responsive to the dimmer signal.

9. The lighting system ballast of claim 1 wherein the sensor comprises a phase angle detector to detect the phase delay of the dimmer signal to determine the dimming level.

10. The lighting system ballast of claim 1 further comprising a power factor converter coupled to the light source driver stage and the controller, wherein the controller is further configured to generate a power factor control signal to control power factor correction of the power factor converter and the power factor converter is configured to provide power factor corrected energy to the light source driver stage.

11. A method of supplying a drive current to one or more light emitting diodes, the method comprising:

receiving a phase modulated dimmer signal wherein a phase delay of the phase modulated dimmer signal indicates a dimming level;

generating a dimmer output signal representing a dimming level indicated by the dimmer signal;

generating a drive control signal to cause the drive current to respond to the dimmer output signal; and providing the drive control signal to a switch to vary conductivity of the switch and cause the drive current supplied by the light source driver stage to each of the light emitting diodes to be approximately constant through a cycle of the phase modulated dimming signal.

12. The method of claim 11 further comprising converting the dimming signal into a digital dimmer signal.

13. The method of claim 11 further comprising spreading a spectrum of the drive control signal.

14. The method of claim 11 further comprising mapping the dimming level to the drive control signal using a predetermined lighting output function.

15. The method of claim 14 wherein the lighting output function maps dimming levels indicated by input voltage to predetermined values different than the dimming levels indicated by the input voltage.

16. The method of claim 11 further comprising:
detecting a phase angle of the dimmer signal; and
determining a dimming level of the dimmer signal from the phase angle.

17. The method of claim 16 further comprising:
generating a threshold signal representing the duty cycle of the dimmer signal;
receiving a feedback signal proportional to a drive current level;
generating a comparison signal representing an outcome of a comparison between the feedback signal and the threshold signal; and
adjusting the drive control signal in response to the comparison signal so that the energy delivered by the light source driver stage is responsive to the dimmer signal.

18. The method of claim 11 further comprising generating a power factor control signal to control power factor correction of a power factor converter, wherein the power factor converter is configured to provide power factor corrected energy to the light source driver stage.

19. A lighting system comprising:
a light source ballast system, wherein the light source ballast system comprises:
a power factor converter and drive system to receive an alternating current, phase modulated dimmer input voltage, to convert the input voltage into a power factor corrected direct current (DC) output voltage, and to generate a light emitting diode drive current, wherein a phase delay of the dimmer input voltage indicates a dimming level; and
a ballast controller, coupled to the power factor converter and drive system, to generate one or more control signals for the power factor converter and drive system to control power factor correction and to adjust the drive current in conformance with the dimming level represented by the dimmer signal, wherein the drive current is approximately constant throughout a cycle of the phase modulated input voltage for each dimming level and the level of the constant drive current varies in response to variations in the indicated dimming level.

20. The lighting system of claim 19 further comprising:
a dimming level detector and converter coupled to the ballast controller to receive the phase modulated dimmer input voltage and to detect a dimming level indicated by the input voltage signal; and
a dimmer mapping system to map the dimming levels indicated by the input voltage to predetermined values different than the dimming levels indicated by the input voltage.

21. A method of responding to a dimmer signal and supplying a constant voltage and variable drive current to a light source, the method comprising:
receiving an alternating current, phase modulated dimmer input voltage, wherein a phase delay of the dimmer input voltage indicates a dimming level;
generating one or more control signals for a power factor converter and drive system to control power factor correction and to vary the drive current in conformance with the dimming level represented by the dimmer signal, wherein the drive current is approximately constant throughout a cycle of the phase modulated input signal for each dimming level and the level of the constant drive current is varied in response to variations in the indicated dimming level.

22. The method of claim 21 further comprising:
detecting a dimming level indicated by the input voltage signal; and
a dimmer mapping system to map the dimming levels indicated by input voltage to predetermined values different than the dimming levels indicated by the input voltage.

* * * * *